United States Patent
Giacalone et al.

(10) Patent No.: US 6,571,268 B1
(45) Date of Patent: May 27, 2003

(54) MULTIPLIER ACCUMULATOR CIRCUITS

(75) Inventors: Jean-Pierre Giacalone, Vence (FR); Francois Theodorou, Cagnes-sur-Mer (FR); Alain Boyadjian, Vallauris (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,167

(22) Filed: Oct. 1, 1999

(30) Foreign Application Priority Data

Oct. 6, 1998 (EP) ............................................. 98402452
Oct. 6, 1998 (EP) ............................................. 98402455

(51) Int. Cl.$^7$ ................................................ G06F 7/38
(52) U.S. Cl. ...................................................... 708/524
(58) Field of Search ........................ 708/524; 712/218; 713/320–321

(56) References Cited

U.S. PATENT DOCUMENTS

| | | | |
|---|---|---|---|
| 4,575,812 A | 3/1986 | Kloker et al. ............... 364/760 |
| 4,597,053 A | 6/1986 | Chamberlin ................. 364/760 |
| 4,644,466 A | * 2/1987 | Saito ........................... 712/218 |
| 4,771,379 A | 9/1988 | Ando et al. .................. 364/200 |
| 4,831,577 A | 5/1989 | Wei et al. .................... 364/757 |
| 4,843,585 A | 6/1989 | Williams ..................... 364/759 |
| 4,866,715 A | 9/1989 | Van Meerbergen et al. ... 371/27 |
| 4,876,660 A | 10/1989 | Owen et al. ................. 364/754 |
| 4,887,233 A | 12/1989 | Cash et al. .................. 364/757 |
| 4,991,131 A | 2/1991 | Yeh et al. .................... 364/748 |
| 5,038,315 A | 8/1991 | Rao ............................ 364/760 |
| 5,442,580 A | * 8/1995 | Fettweis ...................... 708/524 |
| 5,442,805 A | 8/1995 | Sagers et al. ................ 455/33.1 |
| 5,444,646 A | 8/1995 | Covey ........................ 364/750.5 |
| 5,467,476 A | * 11/1995 | Kawasaki .................... 712/218 |
| 5,497,342 A | 3/1996 | Mou et al. .................. 364/786 |
| 5,504,915 A | 4/1996 | Rarick ......................... 395/800 |
| 5,522,085 A | 5/1996 | Harrison et al. ............. 395/800 |
| 5,583,804 A | 12/1996 | Seal et al. ................... 364/736 |
| 5,594,679 A | * 1/1997 | Iwata .......................... 708/524 |
| 6,230,180 B1 | * 5/2001 | Mohamed .................... 708/524 |
| 6,317,770 B1 | * 11/2001 | Lim et al. .................... 708/524 |

FOREIGN PATENT DOCUMENTS

| EP | 0 806 772 A1 | 11/1997 | ............ G06F/7/544 |
|---|---|---|---|
| EP | WO 98/38582 | 9/1998 | ............ G06F/15/78 |

OTHER PUBLICATIONS

Marrin, Ken; *Multi–MAC DSPs lay groundwork for next–gen wireless serivces*, Electronic Systems, May 1999, pp. 7–10.

* cited by examiner

Primary Examiner—Tan V. Mai
(74) Attorney, Agent, or Firm—Gerald E. Laws; W. James Brady, III; Frederick J. Telecky, Jr.

(57) ABSTRACT

A multiply-accumulate (MAC) unit, having a first binary operand X, a second binary operand Y, a third binary operand, Booth recode logic for generating a plurality of partial products from said first and second operands, a Wallace tree adder for reducing the partial products and for selectively arithmetically combining the reduced partial products with said third operand, a final adder for generating a final sum, and a saturation circuitry for selectively rounding or saturating said final sum is provided. A dual MAC unit is also provided.

8 Claims, 21 Drawing Sheets

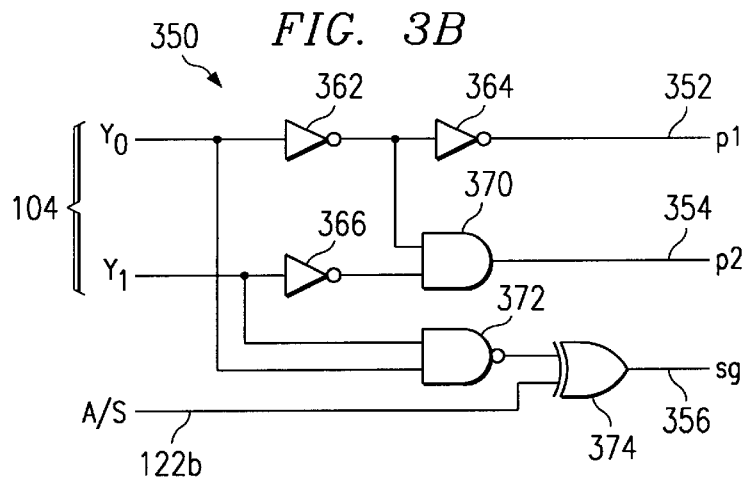

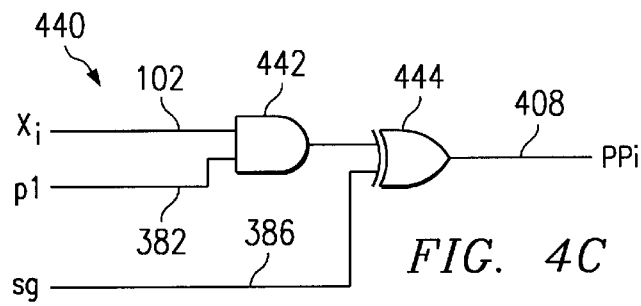
FIG. 4C
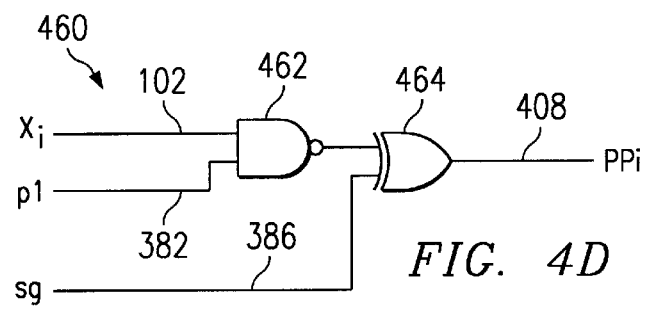
FIG. 4D
FIG. 6
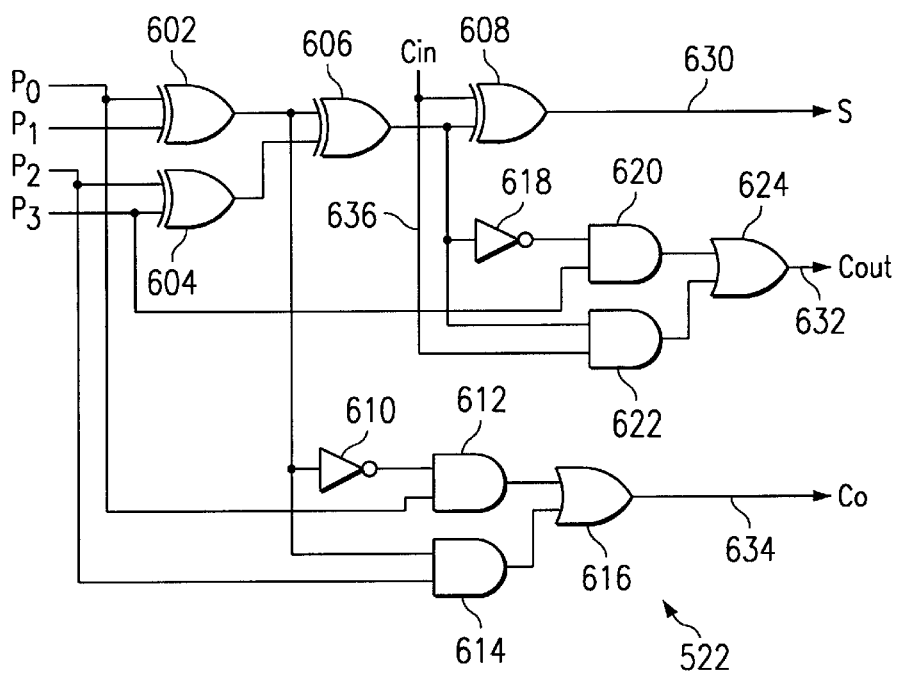

| BIT POSITION NUMBER | 16 | 15 | 14 | 13 | 12 | 11 | ... |
|---|---|---|---|---|---|---|---|
| | 0 | 1 | 0 | 0 | 0 | 0 | ... |

| BIT POSITION NUMBER | 16 | 15 | 14 | 13 | 12 | 11 | ... |
|---|---|---|---|---|---|---|---|
| | 0 | 1 | 0 | 0 | 0 | 0 | ... |
| | 1 | 0 | 0 | 0 | 0 | 0 | ... |

+1)

↑ NEEDS TO BE FORCED TO 0 NO CARRY GENERATED

↑ ZERO DETECTION

FIG. 18C
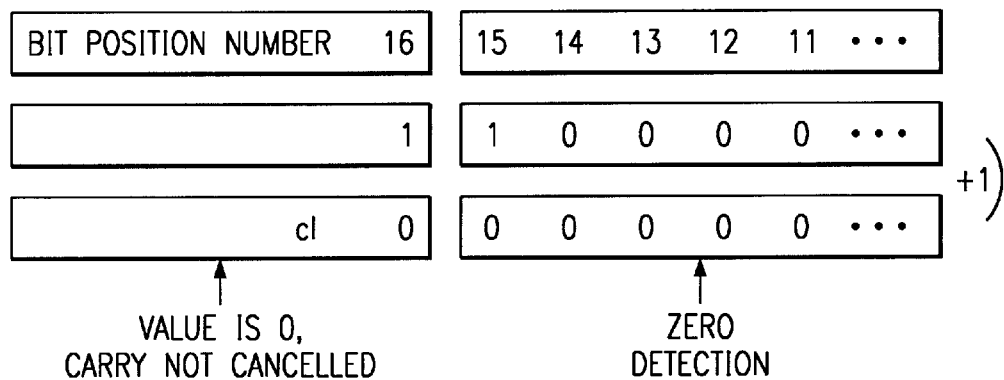
VALUE IS 0,
CARRY NOT CANCELLED
ZERO DETECTION
FIG. 19A
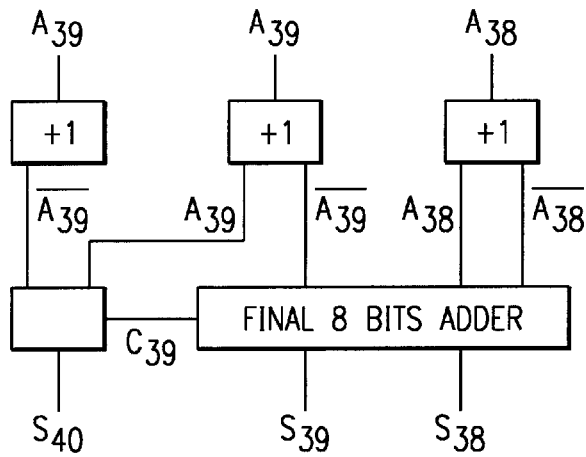
$$S_{40} = \overline{A_{39}} \oplus A_{39} \oplus C_{39} = C_{39}$$
$$S_{39} = \overline{A_{39}} \oplus A_{38} \oplus C_{38}$$
IF $S_{39}$ DIFFERS FROM $S_{40}$, THERE IS AN OVERFLOW
So $ovf = S_{40} \oplus S_{39}$
$ovf = C_{39} \oplus \overline{A_{39}} \oplus A_{38} \oplus C_{38}$
FIG. 19B

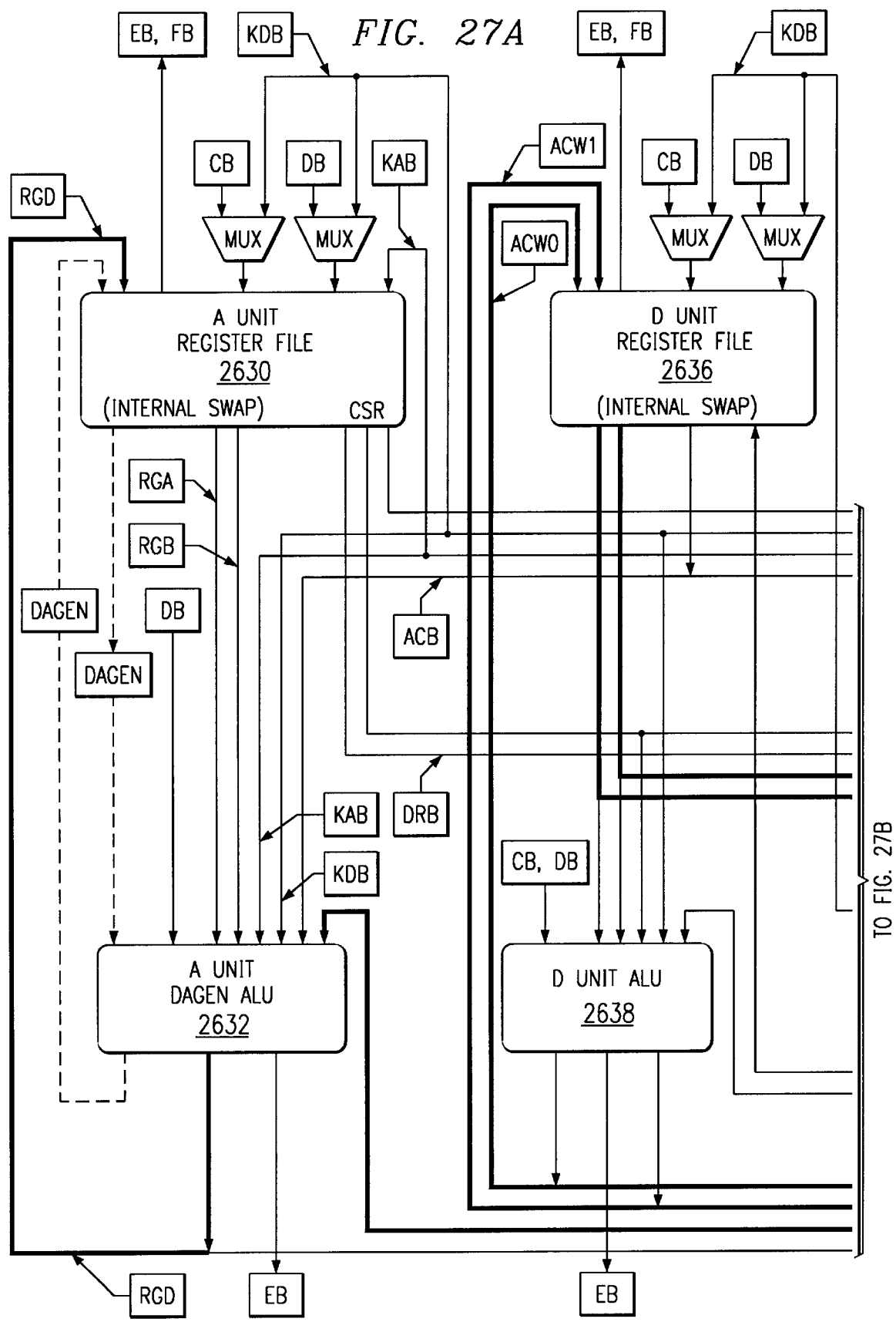

MULTIPLIER ACCUMULATOR CIRCUITS

This application claims priority to Ser. No. 98402452.1, filed in Europe on Oct. 6, 1998 (TI-27757EU) and Ser. No. 98402455.4, filed in Europe on Oct. 6, 1998 (TI-28433EU).

1. Field of the Invention

This invention relates generally to multiplier and multiplier/accumulator circuits and, more particularly, to improved multiplier and multiplier/accumulator circuits which implement modified Booth's algorithm and Wallace tree techniques.

2. Background of the Invention

Binary multiplication is an important function in many digital signal processing applications. Some applications further require arithmetically combining a product with the results of previous operations (e.g. forming a sum of products). A versatile multiplier circuit must have the capability to perform these functions in either a two's complement or an unsigned magnitude notation.

Binary numbers are multiplied very much like decimal numbers. More particularly, each digit of one operand (multiplicand) is multiplied by each digit of the other operand (multiplier) to form partial products and these resulting partial products are then added, taking into account the multiplier digit position place significance.

Circuits for multiplying binary numbers require a relatively large number of circuit elements and thus take up a fair amount of chip area when fabricated on an integrated circuit. For this reason, an ongoing goal of integrated circuit designers is to find ways to implement a multiplier circuit with fewer and fewer circuit elements.

Many techniques are known in the art for reducing the time required to perform a binary multiplication. For example, different encoding methods have been devised which reduce the number of partial products which must be added up to form the final product and for speeding up the addition of partial products. See for example, "A suggestion for a fast Multiplier" C. S. Wallace, IEEE Trans. on Electr. Computers, 1964 and "A Signed Binary Multiplication Technique" Andrew D. Booth, Quart. Journal Mech. and Applied Math., Vol IV, part 2, 1951. The modified Booth algorithm described in the Booth paper is in widespread use and is often used in digital multipliers used in an integrated circuit.

In more detail, the so-called modified Booth encoding technique encodes one of the two numbers being multiplied. This approach reduces, usually by a factor of two, the number of partial products generated by the multiplier, thereby reducing the amount of circuitry needed to combine the partial products in arriving at the final product. Unfortunately, the fact that signed binary numbers are typically represented using two's complement notation—at least when being operated on arithmetically—significantly impacts the above-described advantage of modified Booth encoding because of the need to perform so-called sign-bit extension of the partial products before they can be combined.

U.S. Pat. No. 5,038,315 to Rao, describes a way to eliminate the need to perform sign-bit extension in order to combine the partial products by representing the value represented by the sign bits of all the partial products as a two's complement number. The bits of that number—referred to as the "sign-bit-value" word—rather than the original sign bits, are then used in the partial product addition. Since (as with all two's complement numbers) all the bits of the sign-bit-value word are guaranteed to have positive significance (except for the left-most one), the digits of the partial products can then be directly added without the need for sign bit extension. Implementation of this approach requires significantly less circuit area—as much as 20 percent less—than previously known multipliers.

Attempts have also been made to speed up the summation of the partial products. In U.S. Pat. No. 4,545,028 to Ware the adder array is divided into blocks so that different blocks can perform different parts of the addition in parallel, even though all of the addition within each block is done in ripple fashion. The first block can only contain four partial products and the remaining blocks must match an arithmetic progression so that carries from one block appear when needed by the next block.

Summation can also be speeded up through use of a carry look-aheads adders. The propagation of carries through a sequential series of adder stages in ripple fashion requires a greater period of time as a function of the larger number of bits in the addends. In a carry look-ahead adder, logic circuitry provides concurrent carry propagation rather than sequential. However, the bit size (or number of bits) of a carry look-ahead adder is limited because the circuit complexity, gate count and chip area rapidly increase as bit size increases.

Circuits which multiply two numbers and sum or accumulate the resulting product with a third number are widely used in signal processing and digital signal processors (DSPs). A typical application of a multiplier/accumulator is the implementation of a finite impulse response (FIR) digital signal filter which sums N products to obtain a sample value at a predetermined time, where N is an integer. A primary objective in performing multiplications and accumulations is to accomplish the mathematical calculation as quickly as possible. However, an increase in speed typically involves an increase in the amount of circuitry and a corresponding increase in the irregularity of structure.

Various attempts to increase the speed of an array multiplier have been made. Stylianos Pezaris in an article entitled "A 40-ns 17-Bit by 17-Bit Array Multiplier" in IEEE Transactions on Computers, Vol. C-20, No. 4, April 1971, pp. 442–447, teaches the reduction of propagation of sum signals in an array multiplier. For a conventional multiplier, N rows of adders are required for an N-bit by N-bit multiplier to implement a multiplication in a conventional carry save scheme.

Others have skipped both sum and carry signals over alternate rows of adders in a multiplier array, as taught by Iwamura et al. in "A 16-Bit CMOS/SOS Multiplier-Accumulator" in IEEE International Conference on Circuits and Computers, Sep. 29, 1982, pp. 151–154. Iwamura et al. described a multiplier which utilizes a row skipping technique of carry and sum signals. The skipping technique is used with a conventional array multiplier rather than other methods such as Wallace tree or Booth's method because of the complicated interconnections and irregularity of structure associated with these other methods. However, by skipping carry and sum signals over the next row, the array is effectively divided into two separate arrays, each of which provides a sum and a carry accumulation. At the bottom of the array, two combining rows of adders (not shown by Iwamura et al.) are required. The combining rows reduce the four outputs (two sums and two carrys) of the two separate accumulator paths to two outputs (one sum and one carry) for carry propagation in a final row. A final row of carry look ahead adders is required to provide the output product.

U.S. Pat. No. 5,504,915 to Rarick provides a modified Wallace-Tree adder for use in a binary multiplier.

Other approaches for multiplier accumulator circuits are provided by U.S. Pat. No. 4,575,812 to Kloker et al., U.S.

Pat. No. 4,876,660 to Owen et al., and U.S. Pat. No. 4,831,577 to Wei et al.

U.S. Pat. No. 4,771,379 to Ando et al. provides a digital signal processor with parallel multipliers.

Accordingly, it is a principal aspect of the present invention to provide a circuit and method for fast generation of and parallel summation of partial products with minimum power, complexity, and space in an integrated circuit.

It is another aspect of the present invention to provide an improved, high-speed multiplier accumulator architecture adapted to provide accumulation and adapted to handle either signed or unsigned values.

It is yet another aspect of the present invention to provide high-speed binary multiplication with a parallel adder architecture which can be implemented with standard IC technology.

It is also an aspect of the present invention to provide a circuit employing a plurality of multiplier accumulators for improved multiplication and arithmetical processing.

It is a further aspect of the present invention to provide an improved high speed multiplier circuit for multiplying two numbers or multiplying two numbers and arithmetically combining the result with a third number.

SUMMARY OF THE INVENTION

The present invention provides a MAC unit, having a first binary operand X, a second binary operand Y, a third binary operand, Booth recode logic for generating a plurality of partial products from said first and second operands, a Wallace tree adder for reducing the partial products and for selectively arithmetically combining the reduced partial products with said third operand, a final adder for generating a final sum, and a saturation circuitry for selectively rounding or saturating said final sum.

The present invention also provides a dual MAC, having first inputs associated with a first MAC for producing a first output, second inputs associated with a second MAC for producing a second output, first accumulator for receiving said first output, and second accumulator for receiving said second output.

These aspects and advantages of the present invention will become more apparent from the following detailed description, when taken in conjunction with the accompanying drawings.

BRIEF DESCRIPTION OF THE DRAWINGS

The invention will be understood better once the following detailed description is read, which is only given as an example and made with reference to the attached drawings, in which:

FIGS. 3B and 3C depict modified gate level Booth encoder circuits for first and last stages, respectively, also including an add/subtract (A/S) function;

FIGS. 4A and 4B depict a gate level implementation for a Booth selection stage circuit, with and without sign extension, respectively;

FIGS. 4C and 4D depict a gate level implementation for a final Booth selection stage circuit, with and without sign extension, respectively;

FIG. 6 depicts a gate level implementation for a 4:2 Wallace compressor cell;

FIGS. 17A, 17B, and 17C depict saturation control cells for bit positions 39 to 17, 15 to zero, and 16, respectively;

FIGS. 18A, 18B, and 18C depict when unbiased rounding is needed, and its results for two cases, respectively;

FIG. 19A depicts a gate level implementation for detecting 40 bit overflow;

FIG. 19B depicts generic logic equations for detecting 40 bit overflow;

Corresponding numerals and symbols in the different figures and tables refer to corresponding parts unless otherwise indicated.

DESCRIPTION OF PARTICULAR EMBODIMENTS

Although the circuits and techniques of the present invention lend themselves to use with many different types of digital processing circuitry, the discussion herein will be with respect to implementation in Digital Signal Processors (DSPs). Those skilled in the art after review of this description will recognize that the circuits and techniques of the present invention may be used with other types of processors and utilize other types of digital processor circuitry.

The ongoing goal of integrated circuit designers is to find ways to implement a faster multiplier circuit with fewer and fewer circuit elements. The two main strategies employed to improve multiplier performance are to reduce the number of partial products to be added and to speed up the accumulation of the partial products. The multiplier circuits of the present invention employ both strategies.

Figure 1:
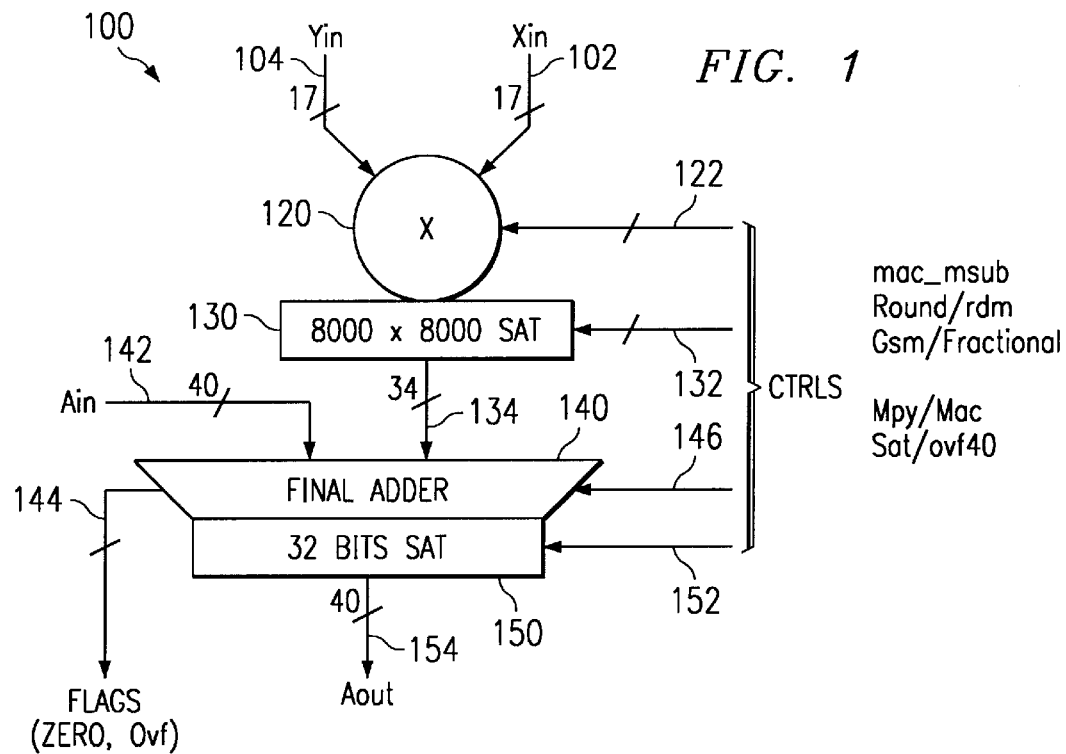
FIG. 1 depicts a high level functional block diagram of the Multiplier/Accumulator (MAC) structure of the present invention.

The following initial discussion specifies the architectural structure and selected circuits for a presently preferred 17 bit by 17 bit (17×17) multiplier/accumulator (MAC) unit with accumulation for 40 bits. Preferably, the multiplier/accumulator unit performs its functions in one clock cycle. This initial discussion does not cover interfaces with a DSP core bus system. Initial discussions will cover the architectural definition, some sub-block analysis and specification of some specific circuits. FIG. 1 shows a high-level functional block diagram of the presently preferred MAC unit 100 of the present invention. For ease of depiction purposes at this high level, some of the signals are depicted in a functional manner in the block diagram of FIG. 1, but more precise descriptions of their connections are provided later herein.

The X- and Y-operands are multiple parallel bit inputs to the multiplier/accumulator unit 100. The multiplier/accumulator unit 100 outputs a result that is, selectively, a product of multiplication, an arithmetic result of combining the multiplication product with a third number, a rounded product or result, or a predetermined saturation value. For a 17×17 multiplier, this result includes 32 parallel bits of sixteen least significant bits (lsbs) and sixteen bits of most significant bits (msbs), each ordered from least to most significant bits. When the product from the multiplication is arithmetically combined with a third number, that third number may be the contents of an accumulator. Operation of the multiplier/accumulator unit 100 is controlled by a plurality of control signals provided by various instructions utilized by the DSP (or other CPU) core in which the multiplier/accumulator circuitry 100 is located.

As FIG. 1 depicts, the multiplier/accumulator (MAC) unit's architecture 100 consists of the following cascaded functional stages (or blocks):

a partial products generation stage 120, with a Fractional mode block (not depicted) under the control of a fractional mode control signal 122, that receives the two 17 bit binary operand inputs 104 and 102, $Y_{in}$ and $X_{in}$, respectively, and then generates a plurality of partial products (PP) that are supplied to the next stage 130;

a partial product summing tree 130 which receives the plurality of partial products as an input and provides a 34 bit output 134, where rounding may be applied ($2^{15}$ binary weight added) under the control of a rounding control signal 132, where saturation may be "forced" depending upon the value of the two inputs 102, 104 and a preselected control signal 132 (represented by the "8000×8000 SAT" in FIG. 1), and where a portion of a third number 142, $A_{in}$, to be added to, or subtracted from, is supplied as an input (not shown in FIG. 1);

a 40 bit final adder stage 140 that receives the 34 bit output 134 of the summing tree 130 and a portion of the third number 142, $A_{in}$, and determines a final arithmetic value or number, and includes appropriate zero and overflow detection 144 with an appropriate indication of the occurrence of these conditions; and a final saturation stage 150 that selectively saturates the final arithmetic value or number from the adder 140 to either "0x007fffffff" (overflow) or "0xff80000000" (underflow) for 32 bits, or "0x7fffffffff" (overflow) or "0x8000000000" (underflow) for 40 bits. The final saturation stage 150 provides for clearing the 16 lsbs to zero when a rounding control signal 152 is active, e.g. when rounding is specified. The final saturation stage 150 provides a 40 bit output 154 that is preferably stored in an accumulator (not depicted in FIG. 1). Various control signals 122, 132, 146, 152 are provided from an instruction decode unit (not depicted in FIG. 1), are discussed herein and are used to control the operation of the MAC unit 100 of the present invention.

Functions that are performed by the presently preferred MAC structure 100 of FIG. 1 are: 1) multiplication of two 17 bit numbers (or operands) 102, 104, represented as MPY[R] $Y_{in}*X_{in}[+2^{15}]$, where $Y_{in}$ 104 and $X_{in}$ 102 are 17 bit operands that may be signed or unsigned; 2) multiplication of two 17 bit numbers 102, 104 and adding their product to a third number 142, represented as MAC[R] $A_{in}+Y_{in}*X_{in}[+2^{15}]$, where $A_{in}$ 142 is a 40 bit value or number from an accumulator (or other source); and 3) multiplication of two 17 bit numbers 102, 104 and subtracting their product from a third number 142 represented as MAS[R] $A_{in}-Y_{in}*Xin[+2^{15}]$. The [R] for all three functions indicates a rounding operator that adds [$+2^{15}$] to the product, or resulting arithmetical number.

Figure 2:
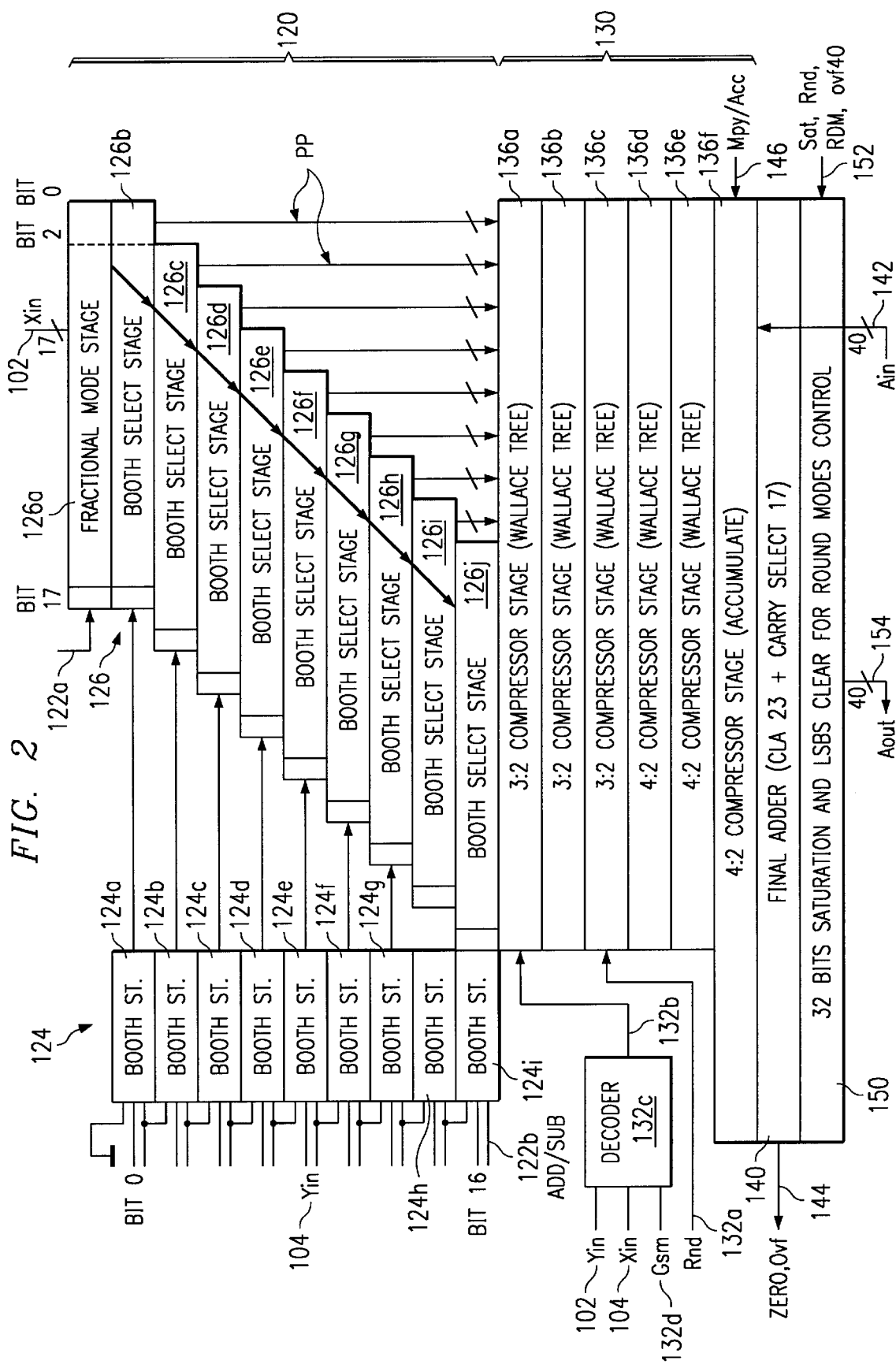
FIG. 2 depicts a more detailed functional block diagram for the MAC of FIG. 1.

FIG. 2 shows a detailed functional block diagram of the presently preferred MAC unit 100 of the present invention. The sub-blocks and some of the specific circuits employed in these various sub-blocks will be discussed later herein.

The publications of Booth and Wallace (cited earlier herein) have shown that, both for power and speed, the partial product generation could use Booth encoding and the sums reduction process could use Wallace tree schemes. A Radix-4 Booth encoding and a Wallace 3:2 and 4:2 based compressor reduction network is utilized in the MAC unit of the present invention and is the best compromise that utilizes both techniques.

Referring now to FIG. 2, it may be seen that the MAC unit 100 of the present invention is constructed from several different functional sub-blocks 120, 130, 140, 150, described with respect to FIG. 1. Continuing to refer to FIG. 2, it may be seen that one operand ($X_{in}$) 102 is provided as an input into a fractional mode block or stage 126a. The input operand's bits are arranged from zero to 17 along the top of the fractional mode stage 126a, from right (zero) to left (17) in FIG. 2. The fractional mode stage 126a is described more fully later herein and is controlled by a fractional mode control signal 122a. The fractional mode block 126a provides its output as the input to the first of multiple cascaded Booth selection blocks or stages 126b–126j. Each of the Booth selection stages 126b–126j is made up of multiple Booth selection circuits, basically one circuit per bit position, that are described more fully later herein, and the stages are offset by two bit positions from one level to the next (thus the stair-step appearance in FIG. 2). It may also be seen that the second operand ($Y_{in}$) 104 is provided as an input to a series of Booth encoder blocks or stages 124a–124i that interconnect with corresponding Booth selection stages 126b–126j. The input operand's bits are arranged from zero to 17 along the left edge of the encoder stages 124a–124i, from top (bit position zero) 124a to bottom (bit position 17) 124i. In addition, an add/subtract signal 122b is provided to the Booth encoder stages 124a–124i. The Booth encoder stages 124a–124i are described more fully later herein. Thus, the partial products generation stage 120 of FIG. 1 is composed of the fractional mode stage 126a, multiple cascaded Booth selector stages 126b–126j and multiple Booth encoder stages 124a–124i.

Continuing to refer to FIG. 2, it may be seen that the partial product summing stage 130 of FIG. 1 is composed of a Wallace tree made up of multiple, preferably six, cascaded compressor stages 136a–136f. The compressor stages 136a–136f generally employ either 3:2 compressor circuits 136a–136c or 4:2 compressor circuits 136d–136f The compressor circuits are described more fully later herein. In addition, it may be seen that the summing stage 130 includes a special decoder block 132c that provides an input 132b to the first compressor stage 136a. Stage 130 also includes a round (rnd) signal 132a to perform rounding, when desired, that provides an input to the third compressor stage 136c. The decoder block 132c receives the two input operands 102, 104 and a control signal 132d. The decoder block 132c and round (rnd) signal 132a are described more fully later herein. There may also be seen a final 4:2 compressor stage 136f, whose output 134 is provided to a final adder stage 140. This final compressor stage 136f is, for ease of depiction purposes, show as the stage where the third number 142, preferably from an accumulator, is combined arithmetically with the resulting product of the two input operands 102, 104 However, as will be noted later herein with respect to FIG. 5, portions (different bit positions) of this third number 142 may be provided to different ones of the multiple compressor stages 126b–126j.

Continuing to refer to FIG. 2, it may be seen that the final adder stage 140 of FIG. 1 receives its input from the last compressor stage 136f of the summing stage 130 and determines if a zero result and/or saturation has occurred and provides flags 144 to indicate these results. The final adder 140 is preferably composed of 23 carry-look ahead adders (CLAs) and 17 carry-select adders. It provides its output to the final saturation stage 150. The circuits for determining when a zero result has occurred or when saturation has occurred are described more fully later herein.

The final saturation stage 150 performs a final saturation to either "0x007fffffff" (overflow) or "0xff80000000" (underflow) for 32 bits, or "0x7fffffffff" (overflow) or "0x8000000000" (underflow) for 40 bits and clears the lower 16 bits to zero when rounding is desired. The final saturation stage 150 is described more fully later herein and is under the control of control signals 152. The final saturation stage 150 provides the final 40 bit output 154.

In summary, the multiplier/accumulator array 100 of the present invention is implemented with modified Booth recode logic 120 for generating a plurality of partial products, a Wallace tree 130 employing a series of compressors for summing the final products in an arithmetic combination with a third number, and a final adder stage 140 for producing a final result that may be rounded or saturated to different values in a final saturation stage 150. Although described herein as a 17×17 MAC with 40 bit accumulation, clearly other operand bit lengths and accumulator bit lengths may be employed and still be within the scope of the present invention.

In operation, the X operand (multiplicand) 102 of M bits is input from a register into a fractional mode stage 126a. The fractional mode block outputs M bits, preferably 17 bits to the first of multiple Booth selection stages 126b–126j. As noted later herein, the fractional mode block effectively shifts the X inputs towards the msb by one bit position, when a Fractional mode control signal is active or operative. The Y operand 104 of N bits is input to the Booth encoder stages 124a–124i from a register. The Booth encoder stages in combination with the Booth selection stages generate the plurality of partial product bits 408. Except for the last stage, each Booth encoder stage has three outputs 302, 304, 306 or 352, 354, 356 connected to a corresponding stage of Booth selection logic 126b–126j, with the selection stages or rows made up of Booth selection circuits 400, 420, 440, 460. The three outputs from a Booth encoder stage correspond to two transitions between each three bits of the Y operand 104 commencing with the two least significant bits, which operate on the X operand 102 to form the partial products 408 in turn.

The array of Booth selection stages for generating the partial products are offset from one another in two bit increments. So the two least significant bits of partial product zero (from the first Booth selector stage 126b) from the array are output together to the Wallace tree adders/compressor stages 130. Similarly, the next two bits of partial product zero are added together with the two least significant bits of partial product one (from the next Booth selector stage 126c) and the sum is output to the Wallace tree adders/compressor stages 130. This procedure continues for the remaining intermediate partial products 408 in the array of Booth selector stages through the next to last Booth selector stage. The last Booth selector stage 126j is offset relative to the first Booth selector stage 126b by 16 bits. Thus, the Booth recode logic of the encoders and selectors controls the partial product generation. The thirty-four bit wide Wallace tree adder/compressor stages accumulate a thirty-four bit word which serves as the input for a final forty-bit wide compressor stage 136f that also "effectively" receives a forty-bit third number, preferably from an accumulator. For multiply only operations the third number or accumulator input is forced to zero. The output from the final compressor stage is provided to a final adder stage 140. The final adder stage 140 provides an output to a final saturation and rounding stage 150 whose output is preferably provided as an input to an accumulator or other register.

A rounding mode control signal determines if rounding is to be performed and at what level in the Wallace tree or final stage. For 40 bit results, the sign status bit, which is updated as a result of a load or an operation is reported according to an M40 flag. When M40 is zero, the sign bit is copied from bit 31 of the result. When M40 is one, bit 39 is copied. The M40 flag determines if 32 bit results are used or 40 bit results are used.

The overflow logic evaluates the most significant bit of the result that is not selected for output and determines if it contains data. If so, this is used as an overflow indicator and an overflow flag is set. An exclusive OR (XOR) gate is used to determine if all the unselected bits are the same and an AND gate is then used to determine when the operation is using unsigned operands if the most significant bit is a zero. The outputs from these two gates are compared in an OR gate which outputs the overflow flag. If signed operands are used the two most significant bits represent the sign and are the same unless an overflow has occurred.

The zero flag is active only when the entire 40 bit result is predicted to be zero by the zero result anticipation (ZRA) circuits described later herein. The negative flag is set when the output is signed and the most significant bit is a "one".

Turning now to the Booth encoders 124a–124i, a Booth encoder is a classical function that is one element useful for reducing the number of partial products to be added. In a Radix-4 modified Booth algorithm encoder, 3 bits of the multiplier operand are encoded to control partial product (PP) generation, multiplicand operand PP generation, multiplicand shifted by one bit position relative to the most significant bits (msbs) PP generation and sign generation.

Table 1 describes the encoder behavior for a presently preferred typical Booth encoder. In Table 1, the three bits of multiplier operand 104 are $Y_{i-1}$, $Y_i$ and $Y_{i+1}$, where i is the bit position. In Table 1, the signals p2, p1, and sg are the output signals from the encoder and "Function" shows the "value" multiplied (*) with this multiplicand value to generate a partial product.

TABLE 1

Booth Encoder Truth Table

| $Y_{i+1}$ | $Y_i$ | $Y_{i+1}$ | p2 | p1 | sg | Function |
|---|---|---|---|---|---|---|
| 0 | 0 | 0 | 0 | 0 | 0 | 0*multiplicand |
| 0 | 0 | 1 | 0 | 1 | 0 | 1*multiplicand |
| 0 | 1 | 0 | 0 | 1 | 0 | 1*multiplicand |
| 0 | 1 | 1 | 1 | 0 | 0 | 2*multiplicand |
| 1 | 0 | 0 | 1 | 0 | 1 | −2*multiplicand |
| 1 | 0 | 1 | 0 | 1 | 1 | −1*multiplicand |
| 1 | 1 | 0 | 0 | 1 | 1 | −1*multiplicand |
| 1 | 1 | 1 | 0 | 0 | 0 | −0*multiplicand |

Figure 3A:
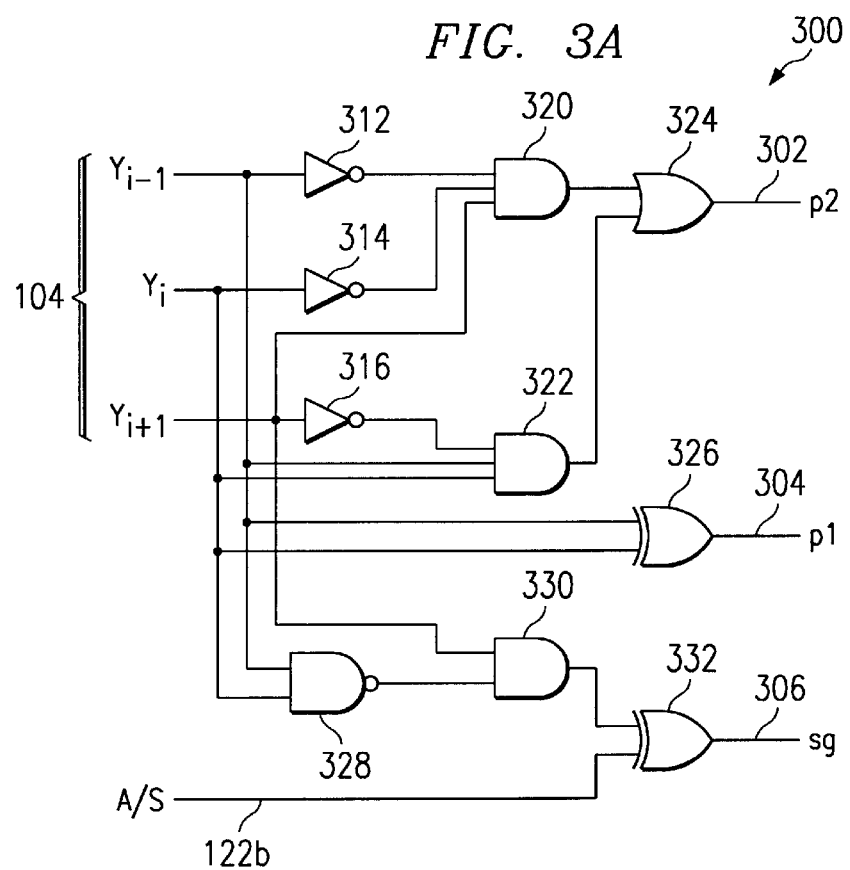
FIG. 3A depicts a gate level implementation for a standard Booth encoder, including an add/subtract (A/S) function.

The Booth encoder equations of Table 1 are preferably implemented in a single encoder circuit. FIG. 3A depicts a gate level implementation for a standard Booth encoder circuit 300, as defined by Table 1, including an add/subtract (A/S) signal. Nine encoder circuits 124a–124i like this are required to encode the 17 bits of the multiplier operand, $Y_i$. The bits are associated and grouped together for encoding as follows:

'M', $Y_0$, $Y_1$→first encoder,
$Y_1$, $Y_2$, $Y_3$→second encoder,
$Y_3$, $Y_4$, $Y_5$→third encoder,
. . . . ,
$Y_{13}$, $Y_{14}$, $Y_{15}$→eighth encoder.
$Y_{15}$, $Y_{16}$→ninth encoder.

However, the "first" encoder circuit 124a/350 is slightly different as the "0 0 0" input configuration will generate p1=p2=0 and sg=1 in order to handle a GSM mode saturation more easily. The "first" encoder circuit 350 is depicted in FIG. 3B. The ninth and last encoder circuit 124i/380 is also different because the last bit is a duplication of the sign bit, which simplifies its logic structure. The last encoder circuit 380 is depicted in FIG. 3C. The add/subtract (A/S) signal 122b defines addition of the product to or subtraction of the product from the third number (accumulator) value 142. The add/subtract (A/S) signal 122b has the effect, that if the "multiply—and—subtract" mode is selected, of complementing the sign bit, "sg" value (in Table 1 entries), via an XOR gate, as described more fully later herein.

Referring now to FIG. 3A, there may be seen a standard Booth encoder circuit 300/124b–124h. This circuit 300 has the Yi−1 bit 104 provided as the input to a first inverter 312, as one input to a first three input AND gate 322, as one input to a first two input XOR gate 326, and as one input to a two input NAND gate 328. The output from the first inverter 312 is provided as one input to a second three input AND gate 320. The Yi bit is provided as an input to a second inverter 314, as a second input to the first three input AND gate 322, as a second input to a two input NAND gate 328, and as the second input to the first two input XOR gate 326. The output from the first two input XOR gate 326 is the p1 signal 304. The output from the second inverter 314 is provided as a second input to the second three input AND gate 320. The Yi+1 bit is provided as the input to a third inverter 316, as a third input to the second three input AND gate 320, and as a first input to a two input AND gate 330. The output from the third inverter 316 is provided as the third input to the first three input AND gate 322. The first and second three input AND gates 320, 322 provide their outputs as the inputs to a two input OR gate 324. The output of the OR gate 324 is the p2 signal 302. The output from the NAND gate 328 is provided as the second input to the two input AND gate 330. The output from the two input AND gate 330 is provided as one input to a second XOR gate 332. The second input to the second XOR gate 332 is the Add/Subtract signal 122b. The output of the second XOR gate 332 is the sg signal 306. This specific combination of gates implements the logic of Table 1. Clearly, other combinations of gates may be employed to provide this same logical functionality.

Referring now to FIG. 3B, there may be seen a first Booth encoder circuit 350/124a. Circuit 350 has the Y0 bit provided as the input to a first inverter 362, and as one input to a two input NAND gate 372. The output from the first inverter 362 is provided as the first input to a two input AND gate 370, and as the input to a second inverter 364. The output from the second inverter 364 is provided as the p1 signal 352. The Y1 bit is provided as the input to a third inverter 366 and as the second input to the two input AND gate 370. The output of the AND gate 370 is the p2 signal 354. The output from the third inverter 366 is provided as the second input to the two input NAND gate 372. The output from the two input NAND gate 372 is provided as one input of a two input XOR gate 374. The second input to the XOR gate 374 is the Add/Subtract signal 122b. The output of the XOR gate 374 is the sg signal 356. Clearly, other combinations of gates may be employed to provide this same logical functionality.

Referring now to FIG. 3C, there may be seen a final Booth encoder circuit 380/124i. Circuit 380 has the Yi−1 bit provided as the input to an inverter 392 and as one input of a first two input XOR gate 394. The output from the inverter 392 is provided as one input of a two input AND gate 396. The Yi bit is provided as a second input to the first XOR gate 394 and as a second input to the two input AND gate 396. The output of the first XOR gate 394 is the p1 signal 382. The output from the two input AND gate 396 is provided as one input to a second two input XOR gate 398. The second input to the second XOR gate 398 is the Add/Subtract signal 122b. The output of the second XOR gate 398 is the sg signal 386. Clearly, other combinations of gates may be employed to provide this same logical functionality.

Turning now to the Booth selection stages 126b–126j, this discussion describes the generation of the partial products (PPs) that will then be added together. Each Booth selection stage 126b–126j consists of a multiplexer controlled by the signals "p2", "p1" and "sg" previously described. A representative circuit that takes care of one bit of a PP, as described in Table 2 below, is described later herein.

TABLE 2

| p2 | p1 | sg | PP | Function |
|----|----|----|----|----------|
| 0 | 0 | 0 |   | 0 |
| 0 | 1 | 0 |   | 1*multiplicand |
| 1 | 1 | 0 | $X_i$ | Don't care |
| 1 | 0 | 0 | $X_{i+1}$ | 2*multiplicand |
| 1 | 0 | 1 | $\overline{X_{i+1}}$ | −2*multiplicand |
| 0 | 1 | 1 | $\overline{X_i}$ | −1*multiplicand |
| 1 | 1 | 1 |   | Don't care |
| 0 | 0 | 1 | 1 | −1 |

"−2*X" and "−X" selections are provided by inverting the corresponding X bit positions and adding a Booth carry bit at position 0. The Booth carry bit is the "sg" bit value. A dedicated circuit is provided for sign extension management, as described herein with respect to FIGS. 4B and 4D. As noted herein, the PP stage 120 includes fractional mode control.

Partial products are aligned so that each is summed with the next, shifted by 2 bit positions relative to the least significant bits (lsbs). FIG. 4A shows a gate level implementation for a normal Booth selection stage circuit 400. FIG. 4B shows a gate level implementation for a normal Booth selection stage circuit with sign extension 420. FIGS. 4C and 4D show a gate level implementation for a final Booth selection stage circuit without 440 and with 460 sign extension, respectively.

Referring now to FIG. 4A, there may be seen a normal Booth selection circuit 400, without sign extension. This circuit 400 has the Xi−1 bit 102 provided as one input to a first two input AND gate 410 and the p2 signal 402 provided as the second input to this first two input AND gate 410. The p2 signal 402 corresponds to the p2 signals 302, 352 output by the normal Booth encoder circuit 300 or the first Booth encoder circuit 350, depending upon the stage 126b–126i or level in which the circuit 400 is located. The Xi bit 102 is provided as a first input to a second AND gate 412 and the second input to the second two input AND gate is the p1 signal 404. The p1 signal 404 corresponds to the p1 signals 304, 354 output by the normal Booth encoder circuit 300 or the first Booth encoder circuit 350, depending upon the stage or level in which the circuit 400 is located. The outputs from the first and second AND gates 410, 412 are the inputs to a two input OR gate 414. The output from the two input OR gate 414 is provided as one input to a two input XOR gate 416. The second input to the XOR gate 416 is the sg signal 406. The sg signal 406 corresponds to the sg signals 306, 356 output by the normal Booth encoder circuit 300 or the first Booth encoder circuit 350, depending upon the stage or level in which the circuit 400 is located. The output of the XOR gate is a PPi signal 408. Clearly, other combinations of gates may be employed to provide this same logical functionality. These circuits 400 are used in each stage or layer of the multiple Booth selection stages 126b–126i for all of the bit positions, except for the most significant bit position.

Referring now to FIG. 4B, there may be seen a normal Booth selection circuit with sign extension 420. Circuit 420 has the Xi bit 102 provided as one input to a first two input NAND gate 424. The p2 signal 402 is provided as the first input to a two input OR gate 422. The second input to the two input OR gate 422 is the p1 signal 404. The output from the OR gate 422 is the second input to the two input NAND gate 424. The output from the two input NAND gate 424 is provided as one input to a two input XOR gate 426. The second input to the XOR gate 426 is the sg signal 406 and the output of the XOR gate is a PPi signal 408. Again, the p2, p1 and sg signals may be from the normal Booth encoder circuit 300 or the first Booth encoder circuit 350, depending upon the stage or level in which the circuit 400 is located. Clearly, other combinations of gates may be employed to provide this same logical functionality. These circuits 420 are used in each stage or layer of the multiple Booth selection stages 126b–126i for the most significant bit position.

Referring now to FIG. 4C, there may be seen a final stage 126j Booth selection circuit, without sign extension 440. This circuit 440 has the Xi bit 102 provided as one input to a two input AND gate 442 and the p1 signal 382 provided as the second input to this two input AND gate 442. The output from the AND gate 442 is one input to a two input XOR gate 444. The second input to the XOR gate 444 is the sg signal 386. The output of the XOR gate 444 is a PPi signal 408. Clearly, other combinations of gates may be employed to provide this same logical functionality. This circuit 440 is used in the last stage or layer of the multiple Booth selection stage 126j for all of the bit positions, except for the most significant bit position.

Referring now to FIG. 4D, there may be seen a final Booth selection circuit with sign extension 460. This circuit 460 has the Xi bit 102 provided as one input to a two input NAND gate 462 and the p1 signal 382 provided as the second input to this two input NAND gate 462. The output from the NAND gate 462 is provided as one input to a two input XOR gate 464. The second input to the XOR gate 464 is the sg signal 386 and the output of the XOR gate 464 is a PPi signal 408. Clearly, other combinations of gates may be employed to provide this same logical functionality. This circuit 460 is used in the last stage or layer of the Booth selection stage 126j for the most significant bit position.

Figure 5A:
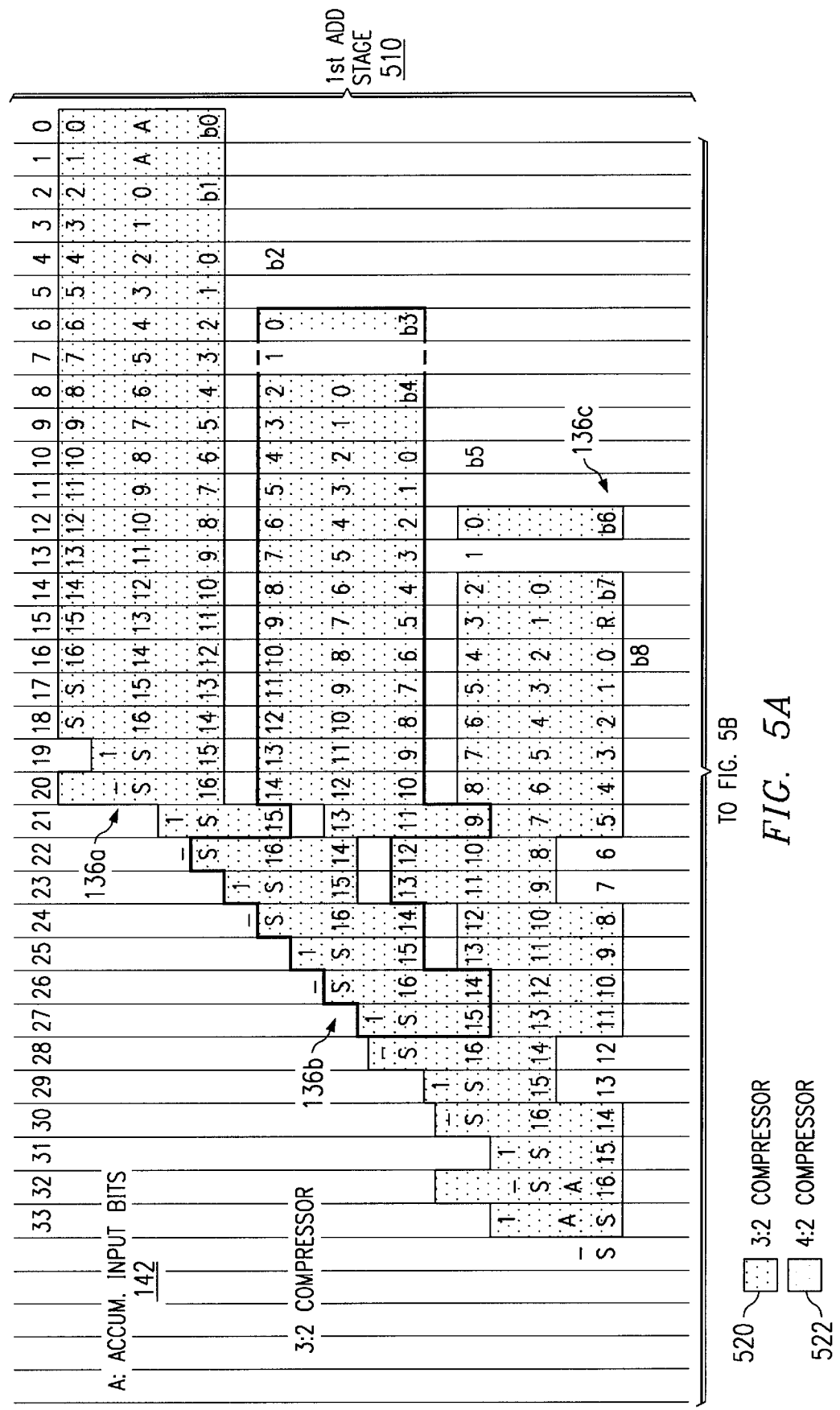
FIG. 5 depicts the alignments of partial products and their reduction using multiple stages of Wallace compressors.
Figure 5B:
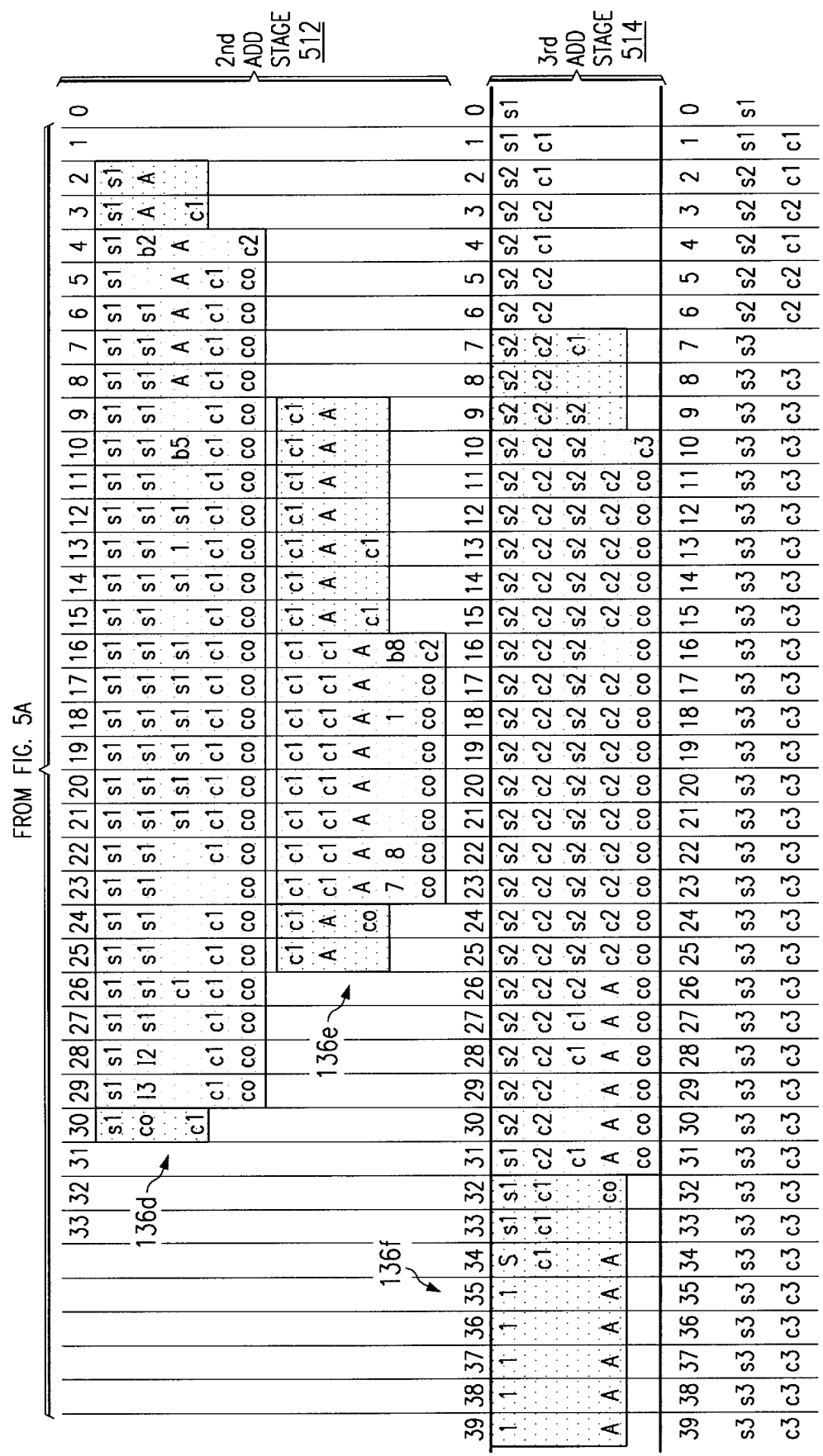

The reduction of PPs 408 using a Wallace tree 130 leads to the most possible parallel but irregular network of compressors. FIG. 5 shows the partial products alignment and reduction using three stages of compressors 510, 512, 514. In order to maintain some regularity in the implementation of the multiplier of the present invention, a mixed scheme of 3:2 and 4:2 compressors is preferably used.

A compressor is a circuit or operator that adds together n PP bits 408 delivering a sum and a carry bit. A 3:2 compressor sums 3 bits and delivers the two mentioned bits (a sum and a carry) which are further reduced in the tree. A 4:2 compressor adds 4 bits together with a carry input and generates the two mentioned bits and a carry output to its neighbor.

Continuing to refer to FIG. 5, there may seen multiple 3:2 compressors 520 and multiple 4:2 compressors 522. The bit positions are numbered 0–33 along the top of FIG. 5 and 0–39 near the bottom of FIG. 5. The third number (or accumulator) input bits are represented by an "A" 142.

The total number of PP reduction or adder stages 510, 512, 514 is preferably three. The first adder stage 510 consists of three rows or layers of 3:2 compressors 136a–136c that generate three (sum, carry) pairs per PP bit. These pairs per PP bit are further reduced by two cascaded stages 512, 514 of 4:2 compressors 136d–136e and 136f, finally delivering a (sum, carry) pair per PP bit that includes any arithmetical combination with a third number input 142. The final sum and carry for each bit position is located at the bottom of FIG. 5 and is provided to the final adder stage 140. The final sum for each bit position is represented by a sum s1 (a sum from the first adder stage), s2 (a sum from the second adder stage), or s3 (a sum from the third adder stage). The final carry for each bit position is represented by a carry c1 (a carry from the first adder stage), c2 (a carry from the second adder stage), or c3 (a carry from the third adder stage).

Referring now to the first 3:2 compressor stage 136a in FIG. 5, there may be seen a single compressor for bit position 0, in the upper right hand portion of FIG. 5. This compressor has three inputs. The first input is the first PP (from the first selection stage 126b) represented by the top "0" in the shaded block representing this compressor. The second input is the bit position 0 value of the third number 142 represented by the "A" in the block. The third input is a Booth carry signal b0 (this signal is rb0 and is described later herein with reference to FIG. 7A) in the block. Similarly, the compressor for bit position 1 includes as its two inputs the second PP (from the first selection stage 126b) represented by the "1" and the bit position 1 value of the third number 142, again represented by the "A"; this compressor behaves as a 2:2 compressor, since it has a carry-in value of zero for its third input (not depicted). The compressor for bit position 2 has as its three inputs the third PP (from the first selection stage 126b) represented by the "2", the zero bit position value of the PP from the second selection stage 126c (first PP from the second selection stage) represented by the "0", and a Booth carry signal b1.

In this manner, the PPs from the first three Booth select stages 126b–126d are summed in the compressors of the first compressor stage 136a. In a similar manner, the PPs from the next three Booth select stages 126e–126g are summed in the compressors of the second compressor stage 136b. Similarly, the PPs from the last three Booth select stages 126h–126j are summed in the compressors of the third compressor stage 136c.

However, it may be seen that the compressor in compressor stage 136a for bit position 21 bridges between the PP from the third selection stage 126d and the PP from the fourth selection stage 126e. Other compressors in bit positions 21–23 and 26–28 for compressor stages 136b and 136c perform similar "bridge" functions. For stage 136c and bit position 10, there may be seen a Booth carry signal b5. This signal b5 is an input for the compressor in stage 136d at bit position 10. Similarly, a Booth carry signal b8, a "7" representing a PP and a "6" representing another PP at compressor stage 136c are inputs for the compressor in compressor stage 136e at bit positions 16, 23 and 22, respectively. Other such signals may be similarly relocated to different compressor stages for ease of connection or layout purposes; the bits for the third number input "A" 142 are found in all three adder stages, for example.

Sign extension overhead in a number of the initial compressor stages is limited via the addition of a "one" at the msb bit position. Sign extension of an operand occurs when the format (number of bit positions) of an operator or register is bigger than an operands. That is, rather than having sign extension values from bit positions 19 to 33 for compressor stage 136a and from bit positions 28 to 33 for stage 136b, "ones" are provided in appropriate msb bit positions in appropriate compressor stages to accelerate the addition process. More particularly, as depicted in FIG. 5 it may seen that a "1" is being added at bit positions 19 and 21 in compressor stage 136a, at bit positions 23, 25 and 27 in compressor stage 136b, at bit positions 29, 31 and 33 in compressor stage 136c, and at bit positions 39–35 in compressor stage 136f to avoid this sign extension overhead. Booth carrys (b0 to b8 signals) are also generally added in the first stage 510. Rounding is performed by adding a "one" at bit position 15 in the third level 136c, represented by an "R" in FIG. 5, of the first stage 510, when the round ("Rnd") control signal 132a is active.

Then, intermediate sum (s1) and carry (c1) bits from the first adder stage are added together, in all bit positions, by a stage of 4:2 compressors. It is followed by another stage of the same type and a stage of half adders to reduce the PPs to a vector of sum and carry bits that will be added by the final adder. FIG. 5 shows the reduction process applied to sum and carry bits created by the network of compressors from partial product reduction and the resulting reduction of those sum and carry bits. Generally, the usage of 4:2 compressors leads to a more balanced signal arrival profile and at the end of the tree. See for example, "Improving Multiplier Design by Using Improved Column Compression Tree and Optimized Final Adder in CMOS Technology", V. G. Oklobdzija et al., IEEE Transactions on VLSI Systems, Vol. 3, No. 2, June 1995, pp 292–301, and "An Integrated Multiplier for Complex Numbers", V. G. Oklobdzija et al., Journal of VLSI Signal Processing, 7, 213–222 (1994).

For a presently preferred Wallace tree implementation, a new circuit has been developed for the 4:2 compressor. Its function and optimized logic expression are generally known. See for example, "A 4.4 ns CMOS 54×54b Multiplier Using Pass—transitor Multiplexer", Norio Ohkubo et al., IEEE CICC '94 Proc., pp 599–602. However, all the delays in the circuit need to be balanced in order to minimize spurious transitions in the tree.

FIG. 6 depicts a presently preferred gate level implementation for a 4:2 compressor circuit 522. More particularly, the circuit has four inputs P0, P1, P2 and P3. These four inputs vary from bit position to bit position within an adder stage (second or third adder stage), but are generally the sums and carrys from compressor circuits of the previous adder stage, selected third number bit position values, and Booth carrys or selected partial products. The first input P0 is a first input to a first two input XOR gate 602 and a first input to a first two input AND gate 612. The second input P1 is a second input to the first two input XOR gate 602. The third input P2 is a first input to a second two input XOR gate 604 and a first input to a second two input AND gate 614. The fourth input P3 is the second input to a second two input XOR gate 604 and a first input to a third two input AND gate 620. The output of XOR gate 602 is an input to a third XOR gate 606, an input to first inverter 610 and the second input to second two input AND gate 614. The output of inverter 610 is the second input to the first two input AND gate 612. The outputs of AND gates 612 and 614 are the two inputs for a first two input OR gate 616, whose output is Co 634 (the carry associated with the sum S 630). The output of XOR gate 604 is the second input to third XOR gate 606. The output of XOR gate 606 is an input to a fourth XOR gate 608, an input to second inverter 618 and an input for a fourth two input AND gate 622. The output of second inverter 618 is the second input to the third two input AND gate 620. A carry-in signal, Cin, 636 is the second input for the fourth XOR gate 608 and the second input for fourth AND gate 622. The output of XOR gate 608 is the output sum signal, S, 630. The outputs of AND gates 620 and 622 are the inputs to second two input OR gate 624. The output of OR gate 624 is the carry out signal, Cout, 632 for the next compressor. This circuit, implemented using pass transistor techniques for XOR gates and multiplexers, provides a fast and balanced path from the four inputs to an output sum S, to an output carry Co and from the nearest neighbor carry in Cin to the nearest neighbor carry out Cout.

For a 3:2 compressor circuit, a specific "a+b+1" circuit is preferred that complies with equations "sum=!(a XOR b)" and "carry=a|b", as illustrated in the Table 3.

TABLE 3

3:2 Compressor Logic Table

| | | a + b + 1 | |
|---|---|---|---|
| a | b | sum | carry |
| 0 | 0 | 1 | 0 |
| 0 | 1 | 0 | 1 |
| 1 | 0 | 0 | 1 |
| 1 | 1 | 1 | 1 |

Figure 7A:
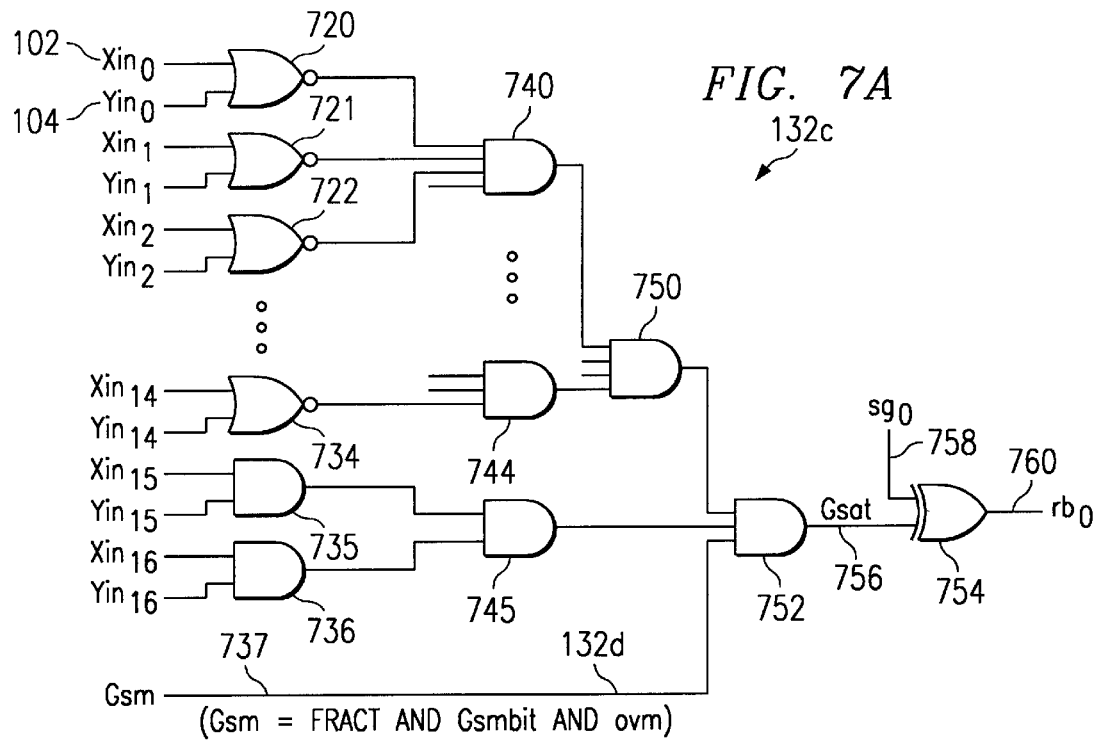
FIG. 7A depicts a representative gate level circuit for decoding and controlling GSM, Saturation and Fractional modes.
Figure 7B:
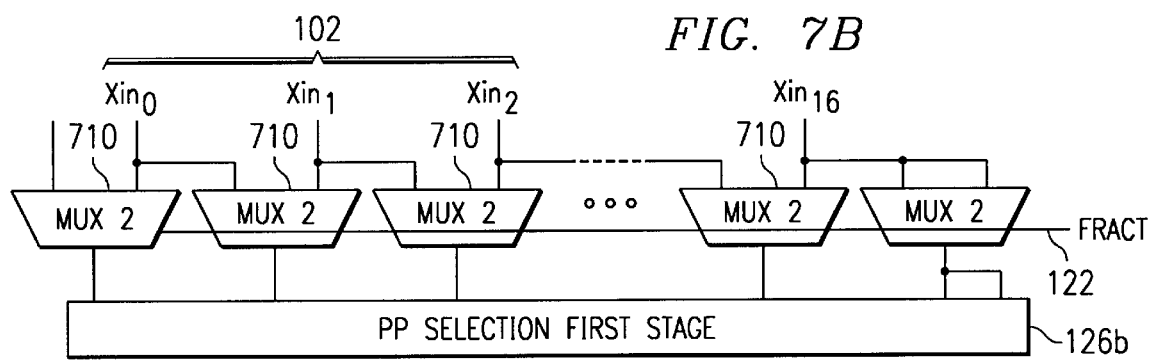
FIG. 7B depicts a functional block diagram for implementing a Fractional mode.

As depicted in FIG. 7B, fractional mode, under control of a fractional mode control signal 122, consists of shifting the $X_{in}$ operand 102 by one bit position relative to the msbs. It is implemented via a plurality of 2-input multiplexers ("mux2") 710, one for each bit position.

As depicted in FIG. 7A, a GSM saturation means that if "x18000" is multiplied by "x18000", the result must be forced to "007ffffff" (or "0080007fff" when rounding is active) if the fractional, GSM and saturation control signals are active. Decoding of the special $X_{in}$ and $Y_{in}$ GSM operands is preferably performed by standard logic 132c, as illustrated in FIG. 7A. The result will complement the Booth carry (b0) of the first stage in order to provide all ones for the first row of partial products. This reduces the total decode time to no longer than the delay through the Booth encoding and PP selection stages.

Continuing to refer to FIG. 7A, there may seen a plurality of two input NOR gates 720–734, each representing a bit position from 0 to 14 and having corresponding X and Y inputs for each bit position. AND gates 735 and 736 represent bit positions 15 and 16 and have corresponding X and Y inputs for those two bit positions. The outputs of the NOR gates are collected in a set of four input AND gates 740–744, while the outputs of AND gates 735 and 736 are collected in AND gate 745. The outputs from the four input AND gates 740–744 are collected in four input AND gate 750. The output from AND gate 750, AND gate 745, and the GSM control signal 737 are the inputs for a three input AND gate 752. The output of AND gate 752, Gsat 756 represents a GSM saturation signal. This signal is one input to two input XOR gate 754 and the other input is the sg0 signal from the first Booth encoder 124a. The output of XOR gate 754 is the rb0 signal 760 that is supplied as the first Booth carry signal to the compressor in bit position 0 in the first compressor stage 136a as described earlier herein.

The final adder stage 140 receives as its inputs the results from the addition of the third number or accumulator content 142 with the reduced sums and carrys from final compressor stage 136f and for the first seven lsbs from earlier compressor stages. These compressor operations reduce the $A_{in}$, sum and carry busses to a new set of sums and carrys. The final sums and carrys are provided to a final 40 bit adder to get the final result, which is then analyzed for 32 bit saturation detection in the final saturation stage 150.

High speed architectures for a final adder 140 generally require Carry Look Ahead techniques (CLA) which result in various implementations. However, a one block CLA for 40 bits leads to the carry propagation scheme of a 64-bit adder, with respect to both speed and silicon area. Another technique, based on the observation of the partial product reduction tree delay profile, allows for limiting a pure CLA implementation to the lower bits up to the bit position where this delay starts to decrease. For the remaining bits (msbs), the carry propagation effect is reduced by choosing a Carry Select adder scheme where the selection is performed by the carry output of the first CLA adder. Within the Carry Select architecture, any delay arrival profile can again be taken into account by propagating the carry with a variable carry skip scheme. This implementation has the advantages of reducing bit flipping or toggling of the higher bits of the adder during the PP reduction process, while getting a smaller CLA structure and maintaining speed. However, it is less regular for implementation in silicon.

Figure 9:
FIG. 9 depicts a 3:2 compressor network used to arithmetically combine third number bits with extension bits for sign extension, before going to the final adder.
Figure 8:
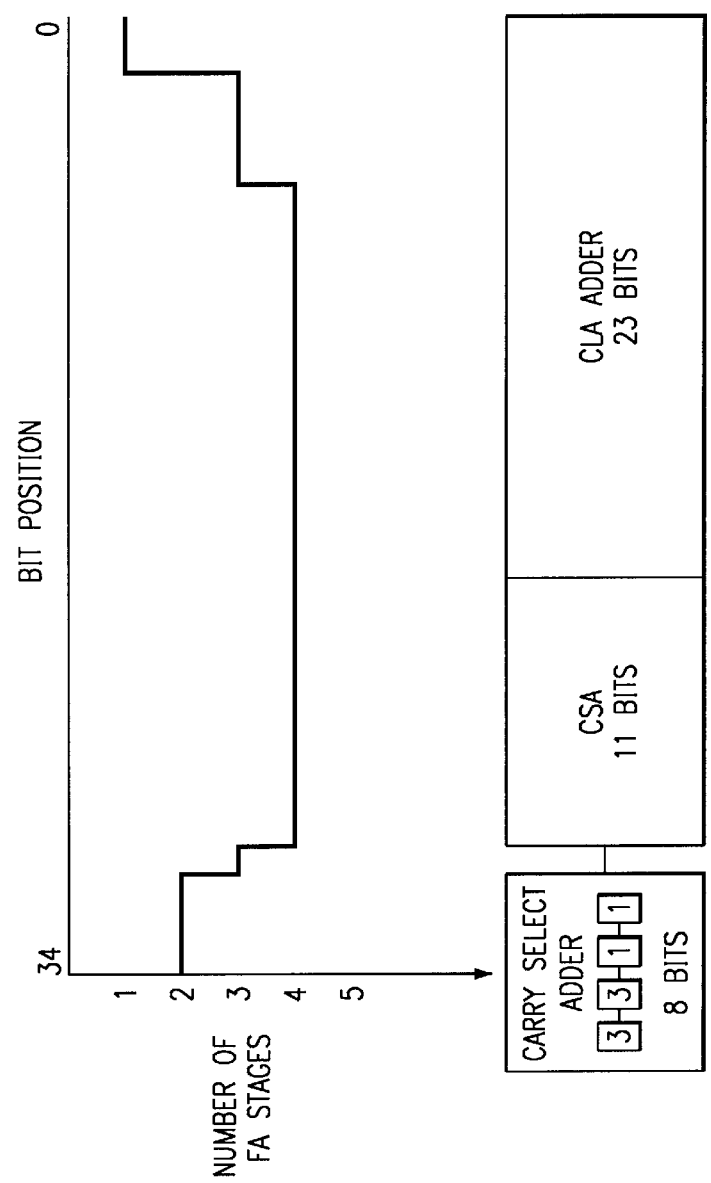
FIG. 8 depicts the delay arrival profile for partial product reductions, in terms of elementary full adder delays, and a functional block diagram for the final adder structure.

FIG. 8 depicts a simulated delay arrival profile for the partial product reduction, in terms of elementary full adder delays, and the corresponding presently preferred final adder structure 140 below that profile. Two status bits, reporting overflow and zero detection, also have to be created. Overflow detection is described later herein. The zero detection scheme is also described later herein. FIG. 9 shows the last five msbs 39–35 from compressor stage 136f. All five of these bit positions are depicted as having a 3:2 compressor circuit in FIG. 5. However, as may be seen by reviewing FIG. 5, the bit positions 39–35 only have two inputs, as depicted in FIG. 9. This 3:2 compressor network is used to add the third number or accumulator bits into the extension bit positions 39–35, before passing the results on to the final adder 140. Sign extension is preferably implemented by adding "ones" from bit position 35 to bit position 39. The third number or accumulator value $A_i$ n [39:0] is forced to "0" if a multiply only function is selected. So, in FIG. 9, the "$A_i$" in bit positions 39–35 are either the third number or accumulator value $A_{in}[i]$ when a MAC or MAS operation is selected or a "zero" for a MPY operation. Thus, the MPY/MAC control signal 146 determines whether the third number or accumulator values are selected or a zero is forced into all the third number bit positions. When this control signal 146 is active or high, the third number or accumulator values are used for all the bit positions.

When the final result, at the final adder 140 output, is zero the corresponding zero detection flag is preferably set to one. If the rounding mode is also active, the 16 least significant bits (lsbs) of the result are assumed to be zero for updating the flag, since those bit positions will be cleared to zero. However, conventional zero detection implementations that scan the final result bits (after rounding) to determine how to set the zero detect flag bit normally result in an unacceptable performance degradation from a timing standpoint. Accordingly, the MAC unit of the present invention employs an anticipation scheme, a zero result anticipation (ZRA), in order to update the zero detect flag in parallel with the determination of the final addition result.

Figure 10:
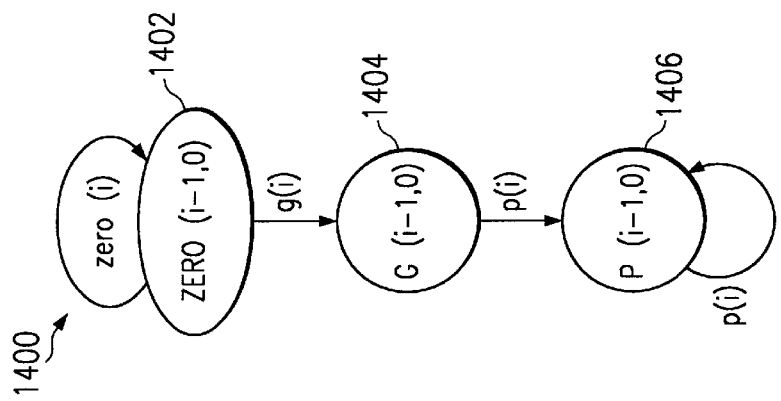
FIG. 10 depicts the zero result anticipation (ZRA) state machine and equations employed in the MAC of FIG. 1.

The zero result anticipation technique relies on early analysis of P, G and Z states for each bit position. Combinations of these states leads to a "state machine" like description in which states of the system are PS (Propagate State), GS (Generate State) and ZS (Zero State). FIG. 10 shows how a system state machine behaves as bit positions are scanned, starting from the lsb. At initialization, the system is in the Zero State. The final zero flag value is the OR of the state bits at the msb position.

A zero detection mechanism based on a Carry Look-Ahead (CLA) adder-like structure will be described. However, before describing an implementation of the zero detection mechanism for the MAC unit 100, a brief description of the mathematical algorithms based on a CLA architecture is as follows:

When a and b are two operands for an addition, then:

$$g(i) = a(i) \bullet b(i) \quad (1)$$

$$p(i) = a(i) \oplus b(i) \quad (2)$$

In equations (1) and (2) above, "g" is a "generate" term and "p" is a "propagate" term. The symbol "•" represents a logical AND operation and the symbol "⊕" represents a logical Exclusive OR (XOR) operation. The "g" and "p" terms are combined to compute a carry. Indeed, $c(i)=G(i)=G(i,0)$, if the carry in $=0$, where:

$$(G(i,0), P(i,0))=(g(0), p(0)), \text{ if } i=0 \quad (3)$$

$$(G(i,0), P(i,0))=(g(i), p(i)) \text{"o"}(G(i-1,0), P(i-1,0))$$

otherwise, and where the operator "o" is defined as:

$$(g\_1, p\_1)o(g\_r, p\_r)=(g\_1+(p\_1 \bullet g\_r), p\_1 \bullet p\_r) \quad (4)$$

In the above equation, the symbol "+" represents a logic OR operation.

It can be demonstrated that since the "o" operator is commutative the following may be derived:

$$(G(n,m), P(n,m))=(G(n,k+1), P(n,k+1))o(G(k,m), P(k,m))(n>k \geq m) \quad (5)$$

and $$((G(n,m), P(n,m))=(G(n-m,O), P(n-m,O))) \ (n>m)$$

The same architecture may be used for several slices of operands, with the result of these calculations being combined to provide global carry generation, based on the 'o' operator. A slice of an operand comprises a range of bits of the operand.

The degree of freedom provided by the index k in the above equation is used to slice the operand in the most efficient way, in terms of propagation delay. This is done by minimizing the global propagation time through the fast carry generator.

In order to illustrate zero detection in a sum, consider a simple example of adding three pairs of 2 bit binary numbers, a and b;

| a: | 00 | 01 | 10 |
|---|---|---|---|
| b: | 00 | 11 | 10 |
| p: | 00 | 10 | 00 |
| g  | 00 | 01 | 10 |

It should be noted that the terms a and b may be exchanged. In order to generalize this to n-bit addition, a new zero term (equation 8 below) is defined and can be combined with equations (1) and (2) above to form a set of three equations (6), (7) and (8) for defining a p(i) bit, a g(i) bit and zero(i) bit, respectively:

| g(i) = a(i) ● b(i) | (6) |
|---|---|
| p(i) = a(i) ⊕ b(i) | (7) |
| zero(i) = ~ (a(i) + b(i)) | (8) |

The representation "~(a(i)+b(i))" indicates the complement of "(a(i)+b(i))".

A combination of the definitions of the three bits as defined in equations (6), (7) and (8) above leads to a state machine definition 1400 of a zero anticipation mechanism as illustrated in FIG. 10, in which the states of the system are:

| ZERO(i,0) | = State zero (1402) |
|---|---|
| G(i,0) | = State generate (1404) |
| P(i,0) | = State propagate (1406). |

Equations for defining the states ZERO(i,0), G(i,0) and G(i,0) are:

| ZERO(i,0) | = zero(i) ZERO(i-1,0) | (9) |
|---|---|---|
| G(i,0) | = g(i) ZERO(i-1,0) | (10) |
| P(i,0) | = p(i) (G(i-1,0) + P(i-1,0)). | (11) |

Thus, a zero (Z) is detected on bit i, if one of these three states is found.

$$Z(i,0)=ZERO(i,0)\|G(i,0)\|P(i,0) \quad (12)$$

In other words, this means that the addition of two operands results in a zero if a state is produced such that an index k ($0 \leq k \leq n$) is found so that:

$$p(n-1)\ldots p(k-1)g(k)\ldots \text{zero}(k-1)\ldots \text{zero}(0) \text{ if}(0 \leq k \leq n) \quad (13)$$

To provide zero detection using the fast carry generation architecture described above, an operator is defined with the same properties as the operator "o". This can be derived from the equation (13) above. Indeed, two operand slices (n,k+1) and (k,m) each result in a zero if they have the property described in equation (13) above. A zero will be detected on a slice (n, m) in the two following cases:

the state of the (k,m) slice is all zeros (A)
the state of (n,k+1) is a zero_detect (i.e. the same as one of the states at (12))(B)

or the state of (k,m) is a zero_detect and the slice contains a "g" (C)
the state of (n,k+1) is all p's (D)

This leads to the following equation:

$$Z(n,m) = \underbrace{((Z(k,m) \text{ and } \sim G(k,m) \text{ and } Z(n,k+1))}_{(A)} \underbrace{}_{(B)} \quad (14)$$

$$\text{or } \underbrace{(Z(k,m) \text{ and } G(k,m)}_{(C)} \text{ and } \underbrace{P(n,k+1))}_{(D)}$$

where $Z(i,i)=g(i)+\text{zero}(i)$.

Also, the G(i,j) and P(i,j) terms can be taken from the adder fast-carry generation intermediate results. Thus, the zero-detection mechanism achieved by modifying the "o" operator in the following way to form a "u" operator which is defined as $$(g\_1, p\_1, z\_1)u(g\_r, p\_r, z\_r)=(g\_1+(p\_1 \bullet g\_r), p\_1 \bullet p\_r, (z\_1 \bullet z\_r \bullet (\sim g\_r))+p\_1 \bullet z\_r \bullet g\_r)$$

Figure 11:
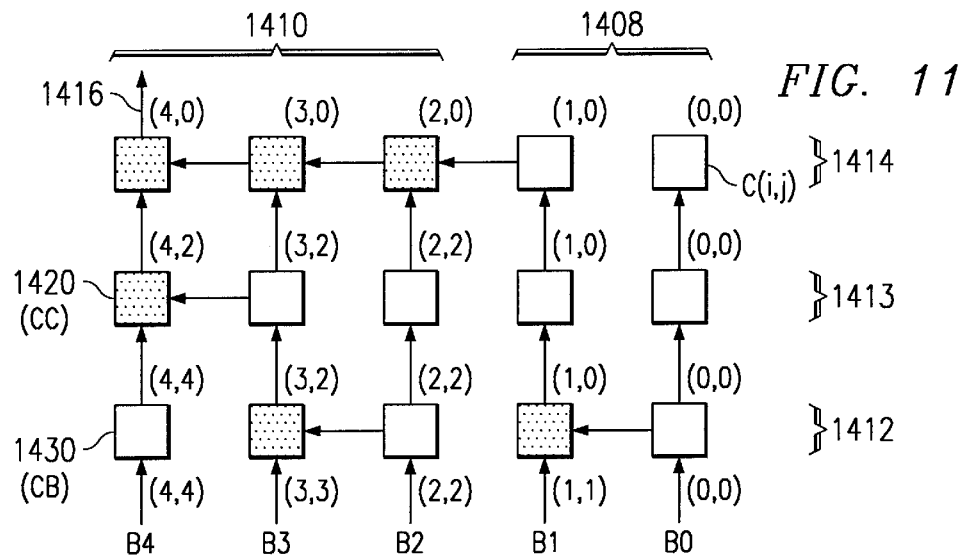
FIG. 11 depicts a block diagram of a representative example of zero detection for a five bit adder array.

FIG. 11 illustrates an representative implementation of a 5 bit time optimal adder including an array of cells C(i,j), including cells CC implementing the operator "u" for combining intermediate anticipation signal and cells CB for forwarding intermediate anticipation signals. The architecture of a 5-bit adder is depicted. In parentheses are slice boundaries (i,j). A slice boundary is the boundary between slices. Each column in FIG. 11 represents a bit position with the bit positions increasing from a lowest significant bit position on the right to successively higher bit positions towards the left.

As illustrated in FIG. 11, the array for a 5-bit operation is sliced into a first sub-array 1408 for a 2-bit operation and a second sub-array 1410 for a 3-bit operation, and that the global result is obtained by combining the two intermediate results via the "u" operator (e.g. (4,4) u (3,2)=(4,2)).

Inputs for bits B0–B4 are supplied to cells of the first row 1412. The intermediate anticipation signals ripple upwards through the second row 1413 and the third row 1414 and towards the left as indicated by the arrows. The signals pass from one row to the next with a delay corresponding to the time taken for the combining of the intermediate results, and are broadcast horizontally to the other cells. The intermediate anticipation result from the first 2-bit operation 1408 is generated at the cell 1415 and is supplied to the third row 1414 of cells of the three bit operation to form the global result at a vertical output from the cell 1416.

It can be shown that the carry__in does not affect the carry generation architecture described above, and can be taken into account at the very end of the calculation. This can be demonstrated by recurrence:

1) the carry__out from the first 1-bit slice is:
   $c(0)=G(0,0)+P(0,0) \cdot \text{carry in}$.
2) Assuming that I exists, such that $c(i)=G(i,0)+P(i,0) \cdot \text{carry\_in}$.
   $c(i+1)=g(i+1)+p(i+1) \cdot c(i)$
   $=g(i+1)+p(i+1) \cdot (G(i,0)+P(i,0) \cdot \text{carry\_in})$
   $=g(i+1)+p(i+1) \cdot G(i,0)+p(i+1) \cdot P(i,0) \cdot \text{carry\_in}$
   $=(g(i+1)+p(i+1) \cdot G(i,0))+\sim(i+1) \cdot P(i,0)) \cdot \text{carry\_in}$
   $=C(i+1,0)+P(i+1,0) \cdot \text{carry}\sim\text{in}$ Thus, the impact of the carry__in on the final result can be computed after the fast_carry generation scheme. This property is also true for zero detection. Indeed if carry__in= 0, then a zero is detected if the property in equation (13) is verified, and if carry__in=1, a zero is detected if the n-bit state is all p's. This results in the equation:

$$\text{zero\_detect} = \text{carry\_in} \cdot Z(n-1,0) + \text{carry\_in} \cdot P(n-1,0).$$

The final result of the zero detection can be supplied to the enable anticipation of a zero result to provide early indication of this zero result.

Figure 11A:
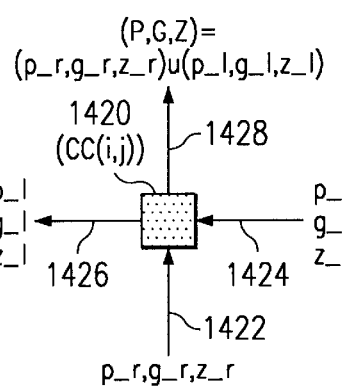
FIG. 11A depicts a schematic representation of a first type of cell of the array of FIG. 11.

FIG. 11A illustrates the inputs and outputs for one of the cells CC(i,j) 1420 which are shown as a closed box in the FIG. 11. This type of implements the "u" operation, and, in the general case, has the following inputs and outputs, both vertically and horizontally:

| | |
|---|---|
| Vertical input (1422): | p__r, g__r, z__r |
| Horizontal input (1424): | p__1, g__1, z__1 |
| Horizontal output (1426): | p__1, g__1, z__1 |
| Vertical output (1428): | P, G, Z = (p__r, g__r, z__r) u (p__1, g__1, z__1) |

It can be seen that a horizontal input (if present) is simply passed to the horizontal out 1426, 1424 (broadcast operation). This is performed without modification and without delay, so that the output signal is available substantially at the time the input signal is available. It can also be seen that the vertical output 1428 is a combination, as defined by the operator "u" of the vertical input 1422 and the horizontal input 1424. This process does take a certain time, so that the vertical output 1428 is available shortly after the vertical and horizontal inputs 1422, 1424 are available. The individual cells need not have a full set of inputs and outputs depending upon its position in the array, as shown in FIG. 11.

Figure 11B:
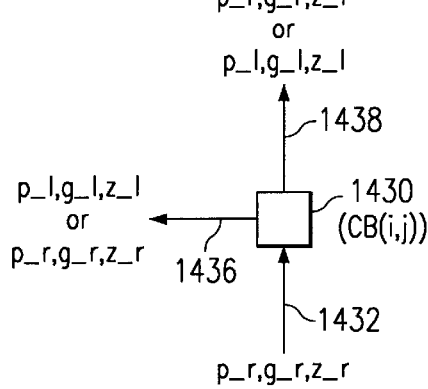
FIG. 11B depicts a schematic representation of a second type of cell of the array of FIG. 11.

FIG. 11B illustrates the inputs and outputs for one of the cells CB(i,j) 1430 which are shown as an open box in FIG. 11. This type of cell simply forwards signals from inputs to outputs of the cells, as illustrated below:

| | |
|---|---|
| Vertical input (1432): | p__r, g__r, z__r |
| Horizontal output (1436): | p__1, g__1, = p__r, g__r, z__r |
| Vertical output (1438): | p__r, g__r, z__r |

The horizontal output signals (p__1, g__1, z__1) at 1436 are copies of the vertical input signals (p__r, g__r, z__r) from 1432, which have been "amplified" by a buffer. The vertical output signals (p__r, g__r, z__r) at 1438 are the vertical input signals (p__r, g__r, z__r) from 1432, which have been "amplified" by a buffer. A vertical input 1432, if present, is passed to the horizontal and vertical outputs, 1436 and 1438 although the output is delayed with respect to the input by an amount corresponding to the delay involved in generating a combination signal in one of the combining cells CC 1420. It will be noted that the individual cells CB 1430 have vertical inputs and horizontal and/or vertical outputs depending upon the position in the array, as shown in FIG. 11.

The delay in the vertical direction provided by the buffer cells is needed in order that propagation of the signals in the upward direction in FIG. 11 runs in parallel in each column. The horizontal propagation is effectively immediate, so that a result is available at the vertical output (where provided) of the last cell in the vertical direction (i.e. the topmost cell as shown in FIG. 11) for each bit position.

As described above, the example shown in FIG. 11 is effectively split into two sub-arrays, with intermediate anticipation signals propagating to the left and upwardly via the various cells in each sub-array, with the output of the first sub-array being combined with the output of the second cell in the third row (i.e. the topmost row of cells.

The intermediate anticipation signals of the operation of the five bit example of FIG. 11 operation are shown in Table 4, where Rows A and B represent two 5-bit input values.

TABLE 4

| | | | | | |
|---|---|---|---|---|---|
| A | 1 | 1 | 0 | 0 | 1 |
| B | 0 | 0 | 1 | 1 | 1 |
| P__in | 1 | 1 | 1 | 1 | 1 |
| G__in | 0 | 0 | 0 | 0 | 0 |
| z | 0 | 0 | 0 | 0 | 0 |
| Stage 1 | P(4,4) = 1 | P(3,2) = 1 | P(2,2) = 1 | P(1,0) = 0 | P(0,0) = 0 |
| | G(4,4) = 0 | G(3,2) = 0 | G(2,2) = 0 | G(1,0) = 1 | G(0,0) = 1 |
| | Z(4,4) = 0 | Z(3,2) = 0 | Z(2,2) = 0 | Z(1,0) = 1 | Z(0,0) = 1 |
| Stage 2 | P(4,2) = 1 | P(3,2) = 1 | P(2,2) = 1 | P(1,0) = 0 | P(0,0) = 0 |
| | G(4,2) = 0 | G(3,2) = 0 | G(2,2) = 0 | G(1,0) = 1 | G(0,0) = 1 |
| | Z(4,2) = 0 | Z(3,2) = 0 | Z(2,2) = 0 | Z(1,0) = 1 | Z(0,0) = 1 |
| Stage 3 | P(4,0) = 0 | P(3,0) = 0 | P(2,0) = 0 | P(1,0) = 0 | P(0,0) = 0 |
| | G(4,0) = 1 | G(3,0) = 1 | G(2,0) = 1 | G(1,0) = 1 | G(0,0) = 1 |
| | Z(40) = 1 | Z(3,0) = 1 | Z(2,0) = 1 | Z(2,0) = 1 | Z(0,0) = 1 |
| Sum | 0 | 0 | 0 | 0 | 0 |

As, in many applications, the intermediate zero anticipation detection results, which are available for the various bit positions in the top row of cells, are not needed. In such cases, the top left cell alone (in FIG. 11, cell CC(4,0)) can be kept as an operator, with one or more of the remaining cells in that row (where the intermediate results are not needed) being replaced by "o" operators, so as to avoid unnecessary logic and improve overall performance. However, "u" operator cells can also be provided at specific bit positions where intermediate zero anticipation results are needed for intermediate bit positions in an embodiment.

Figure 12:
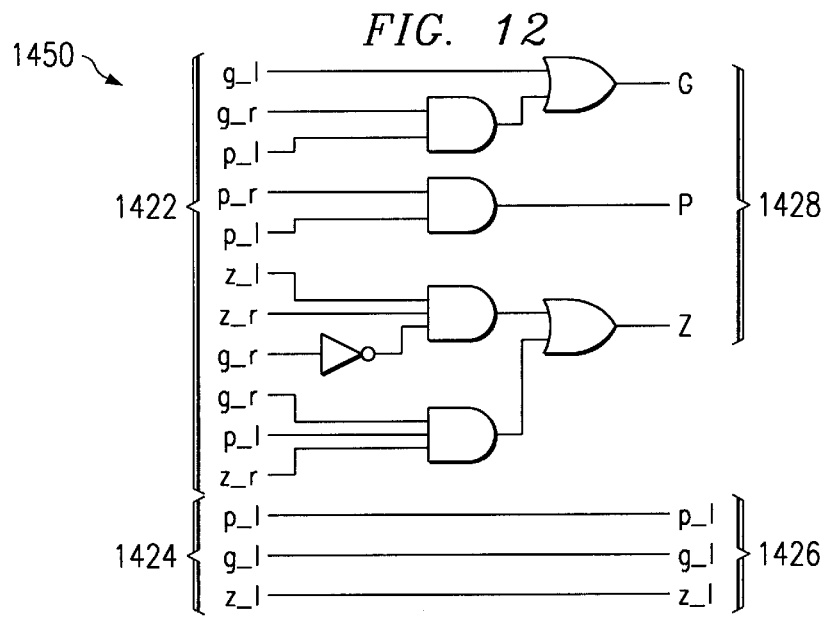
FIG. 12 depicts a gate level implementation for the first type of cell of FIG. 11A.

FIG. 12 is a schematic block diagram of an example of circuitry 1450 including logic gates for implementing the "u" operator in one of the "CC" cells 1420 of FIG. 11A. In this diagram, the inputs 1422 and 1424 shown in FIG. 11A are provided at the left side of the Figure, and the outputs 1426 and 1428 are shown at the right hand side. As can be seen in FIG. 12, the circuitry for the operator includes one inverter, four AND gates and two OR gates. It can be seen that the foregoing gates implement the operator "u". Clearly, other combinations of gates may be employed to implement the operator "u".

Figure 13:
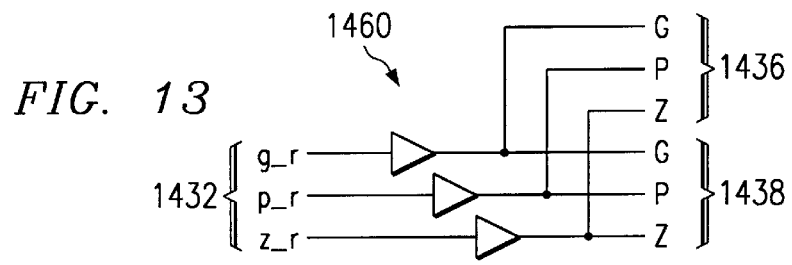
FIG. 13 depicts a gate level implementation for the second type of cell of FIG. 11B.

FIG. 13 is a schematic block diagram of an example of circuitry 1460 for implementing one of the buffer cells CB of FIG. 11B. In this diagram, the vertical inputs 1432 shown in FIG. 13 are provided at the left hand side of the Figure and the horizontal and vertical outputs 1436 and 1438 are shown at the right hand side. As can be seen in FIG. 13, the circuitry includes three buffer (delay) circuits, one for each of the g_r, p_r and z_r inputs 1432. The delay factor of the buffer circuits is selected to match the delay imposed by the circuitry for performing the "u" operation. The outputs from the buffer circuits are supplied to the horizontal and/or vertical outputs 1436 and 1438, depending on the position of the buffer cell CB in the array illustrated in FIG. 11.

Figure 14:
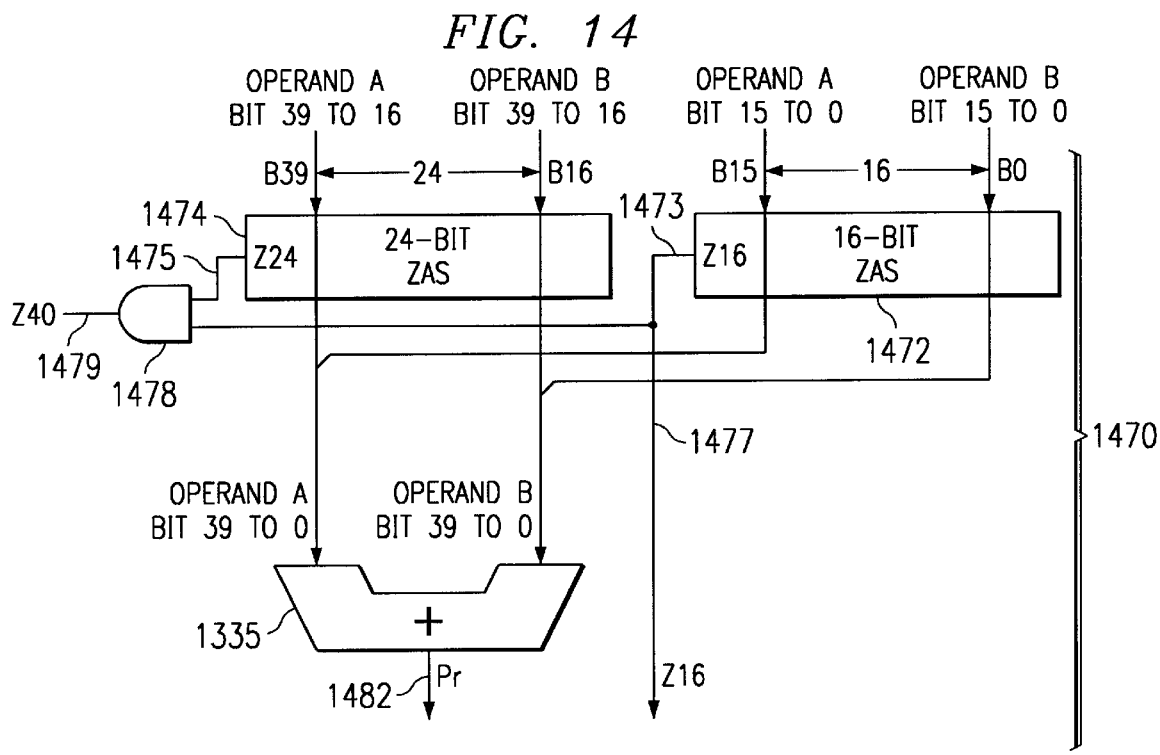
FIG. 14 depicts a schematic block diagram of a representative example of a zero detection circuit.

FIG. 14 is a schematic block diagram of a representative example of a zero detection circuit for a forty-bit final adder stage 140 of a multiply and accumulate unit 100. In this example, zero anticipation is required at forty bits and also at sixteen bits. In FIG. 14, a first zero anticipation stage 1472, provides a zero anticipation output based on 16 bits B0–B15 supplied to it. These sixteen bits B0–B15 for which signals are supplied correspond to the sixteen lowest order bits of the arithmetic unit result. The arithmetic result bits are also supplied to the saturation stage of the MAC. The zero anticipation result signal 1473 on 16 bits is output at 1477. It is also supplied to a logical AND gate 1478 where the signal is added to a partial zero anticipation result signal 1475 from a second zero anticipation stage 1474. The second zero anticipation stage 1474, provides a zero anticipation output based on signals for 24 bits supplied to it. The twenty-four bits for which signals are supplied correspond to the twenty-four highest order bits B16–B39 of the forty bit arithmetic unit result. The arithmetic result bits B16–B39 are also supplied to the final adder stage 140 of the MAC, the output of the final adder stage is the result Pr which then passes to the saturation stage.

By combining the 16 bit zero anticipation result signal with the 24 bit zero anticipation result signal in the AND gate 1478, a global zero anticipation result signal 1479 on 40 bits can be generated at the output of the AND gate 1478.

Figure 15:
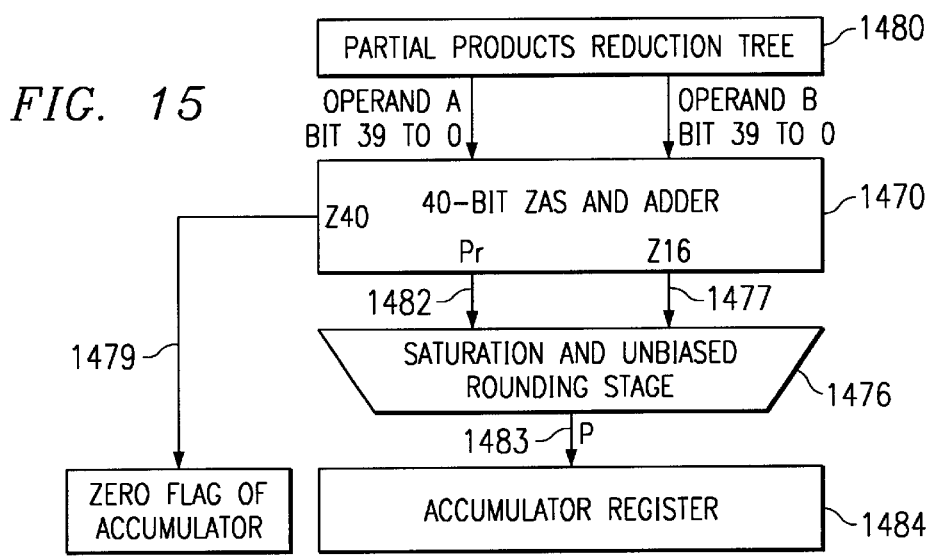
FIG. 15 depicts a schematic block diagram illustrating an implementation of a zero detection scheme in the MAC of FIG. 1.

FIG. 15 illustrates in more detail the connection of the zero anticipation mechanism of FIG. 14 in a MAC unit 100. The outputs from a partial product reduction tree 130 of the MAC is supplied to the forty bit final adder 140 and zero anticipation mechanism 1470. The outputs of the final adder and zero anticipation mechanism comprise the global zero anticipation flag 1479 for the accumulator on forty bits, the result of the final adder and the 16th bit zero anticipation flag. The results from the final adder 1482 and the 16th bit zero anticipation flag 1477 are supplied to the saturation and rounding stage 1476/150 of the MAC, from which the output 1483/154 is supplied to an accumulator register 1484.

In the final saturation stage 150, overflow on the extension bits [bit positions 39:32] is preferably detected and the final result will be forced to either a 32 bit maximum representation of "0x7fffffff" or "0x80000000", or a 40 bit maximum representation of "0x7fffffffff" or "0x8000000000", if the saturation mode is active or "on". If the rounding mode is "on" (or active), then the 16 lsbs will be cleared in this stage.

Figure 16:
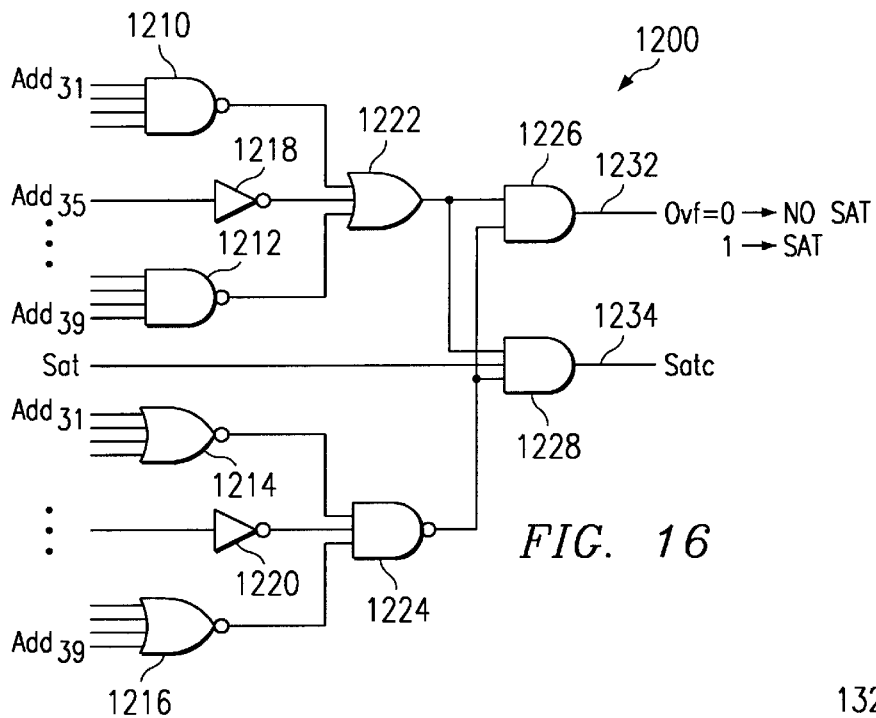
FIG. 16 depicts a gate level implementation for detecting 32 bit saturation.

FIG. 16 shows a circuit for decoding the extension bit positions of the final result to generate an overflow bit, when appropriate. Continuing to refer to FIG. 16, there may be seen two input sections where the bit positions of the result Add31–Add34 are provided to a first NAND gate 1210 and then separately to a first NOR gate 1214. Similarly, the bit positions of the result Add36–Add39 are provided to a second NAND gate 1212 and then separately to a second NOR gate 1216. The remaining bit position of the result Add35 is provided to a first inverter 1218 and then separately to a second inverter 1220. The outputs of the two NAND gates 1210, 1212 and the output of the first inverter 1218 are provided as the inputs to OR gate 1222. The output of OR gate 1222 is provided as one input to a two input AND gate 1226 and as one input to a three input AND gate 1228. The outputs of the two NOR gates 1214, 1216 and the output of the second inverter 1220 are provided as the inputs to NAND gate 1224. The output of NAND gate 1224 is provided as the second input to two input AND gate 1226 and as the second input to three input AND gate 1228. The third input to three input AND gate 1228 is a saturation mode signal 1230. Preferably, this saturation signal corresponds to a saturation mode bit that is "set" to a logic level of one to produce saturated results on overflows or underflows. The output of the two input AND gate 1226 is the overflow flag or signal 1232 (144 in FIG. 1) for the extension bits with a "zero" indicating no overflow and thus no saturation, and a "one" indicating overflow and a saturated result, when the saturation mode is active. The output of three input AND gate 1228 is a saturation control signal 1234, Satc. This saturation control signal is supplied as an input to the saturation control circuits discussed later herein.

As depicted in FIG. 16, overflow in extension bits 39–31 is initiated when the final result, represented by Add39–Add31 in FIG. 16, is different from either "0x1ff" or "0x000". The clamp value is then selected based on the sign of the result at bit position 39 (Add39). If the Rnd control signal is high (at a logic level of one), then the final result in the lsb bit positions, Add15–Add0, is set to "0x0000", in all cases.

Figure 17A:
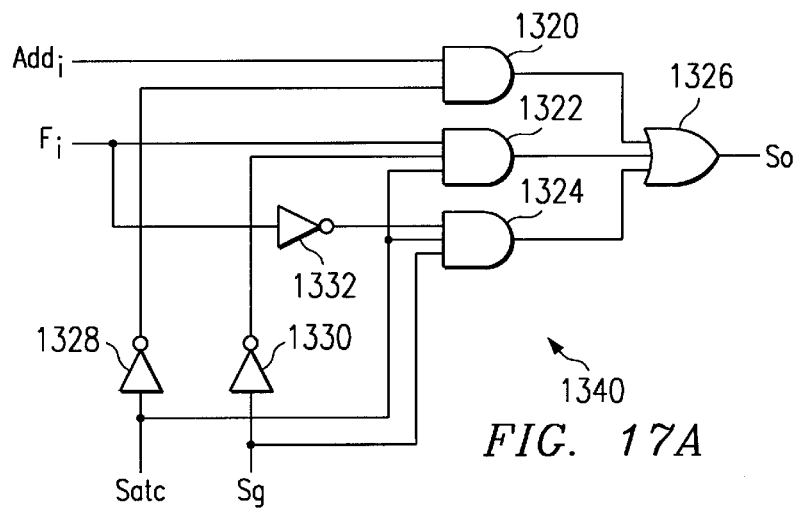
Figure 17B:
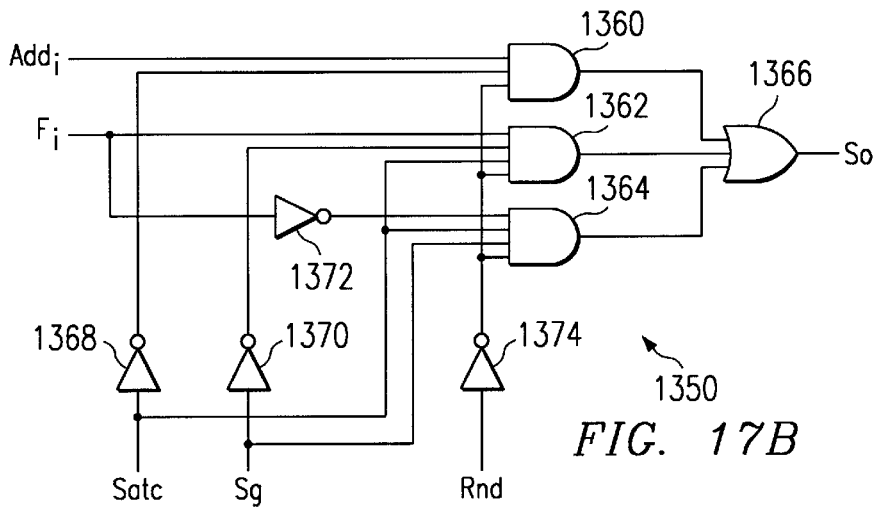
Figures 17C, 18A, 18B:
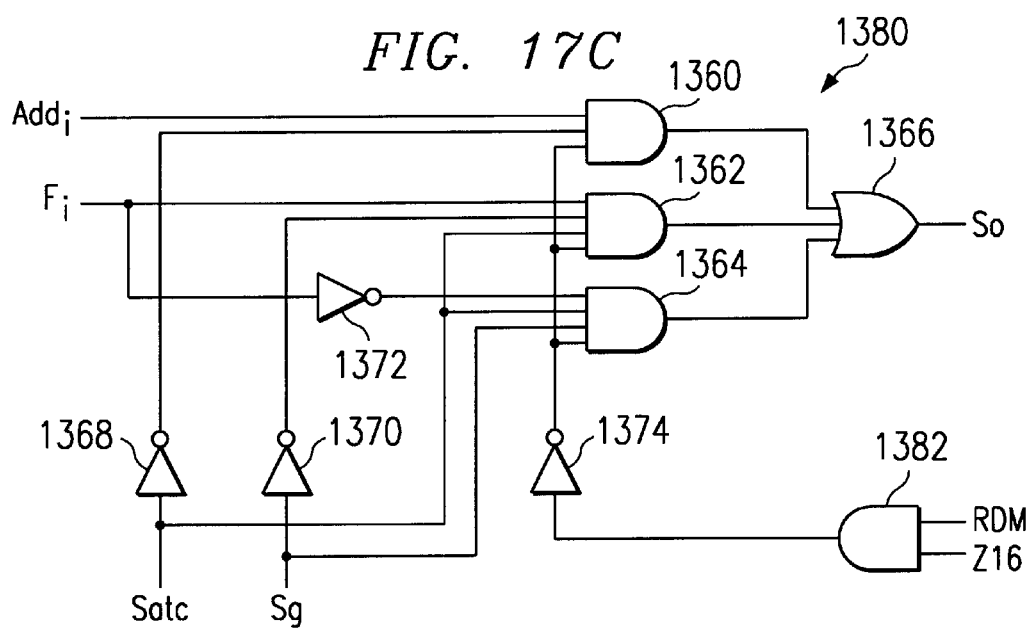

Special saturation circuits have been created to generate these different saturation values. More particularly, a saturation control circuit for bit positions 39 to 17 and a saturation control circuit for bit positions 15 to 0 are provided. FIG. 17A depicts a saturation control circuit for a bit positions lower than 15 and FIG. 17B depicts one for the 39–17 bit positions. FIG. 17C depicts a saturation control circuit for bit position 16.

Referring now to FIG. 17A, there may be seen a circuit 1340 for saturation control useful for bit positions 39–17. More particularly, there may be seen an input signal Addi which is the result bit for the ith bit position. The Sg signal is the sign bit represented by the Addi bit for bit position 39 (i.e. Add39). The Satc signal is the saturation control signal generated by the overflow detection logic of FIG. 16. The Fi signal is the value that the bit position is "forced" to when saturation occurs. The Addi signal is one input to a two input AND gate 1320. The Satc signal is an input to inverter 1328, one input to a first three input AND gate 1322, and one input to a second three input AND gate 1324. The output of inverter 1328 is the second input to AND gate 1320. The Sg signal is the input to inverter 1330 and is a second input to the second three input AND gate 1324. The remaining input signal Fi is the third input to the first three input AND gate 1322 and the input to inverter 1332. The output of inverter 1332 is the third input to the second three input AND gate 1324. The outputs of the three AND gates 1320, 1322, 1324 are provided as the inputs to OR gate 1326, whose output is the saturation value output So.

Referring now to FIG. 17B, there may be seen a circuit 1350 for saturation control useful for bit positions 15–0. More particularly, there may be seen an input signal Addi which is the result bit for the ith bit position. The Sg signal is the sign bit represented by the Addi bit for position 39 (i.e. Add39). The Satc signal is the saturation control signal generated by the overflow detection logic of FIG. 16. The Fi signal is the value that the bit position is "forced" to when saturation occurs. The Addi signal is one input to a three input AND gate 1360. The Satc signal is an input to inverter 1368, one input to a first four input AND gate 1362, and one input to a second four input AND gate 1364. The output of inverter 1368 is the second input to three input AND gate 1360. The Sg signal is the input to inverter 1370 and is a second input to the second four input AND gate 1364. The remaining input signal Fi is the third input to the first four input AND gate 1362 and the input to inverter 1372. The output of inverter 1372 is the third input to the second four input AND gate 1364. The round mode control signal (Rnd) is the input to inverter 1374. The round mode control signal (Rnd) is the signal that controls rounding, i.e. the addition of $2^{+15}$ to the result, and is used to force the 16 lsbs to a "zero" regardless of the value of the Fi signal. The output of inverter 1374 is the third input to three input AND gate 1360, the fourth input to first four input AND gate 1362 and the fourth input to second four input AND gate 1364. The outputs of the three AND gates 1360, 1362, 1364 are provided as the inputs to OR gate 1366, whose output is the saturation value output, So.

Referring now to FIG. 17C, there may be seen a circuit 1380 for saturation control useful for bit position 16. More particularly, it may be seen that FIG. 13C is nearly identical to FIG. 17B, except that the Rnd signal supplied to inverter 1374 of FIG. 17B has been replaced by the output signal, UR, from a two input AND gate 1382. The two inputs to AND gate 1382 are the unbiased Round Mode Signal (RDM) and a signal Z16, which is an output of a portion of the ZRA circuit indicating bit positions 15–0 (the first 16 bits) are zero. The RDM signal is active when unbiased rounding is desired (e.g. the unbiased rounding mode is active). The effect of the SATC signal is to block the Addi value from becoming the output So since saturation takes precedence over unbiased rounding. Thus, a rounded result which overflows is saturated, e.g. forced, to a value of 7fff0000 for 32 bits, and not to 7ffe0000, because bit position 16 (17th bit) of the final adder is forced to zero.

The values of the 16 lsb $F_i$s will a "one" for an overflow and a "zero" for an underflow. The values of the msbs above bit position 16, will depend on whether an overflow or underflow has occurred and will also depend on whether the saturation is for 32 bits or 40 bits.

When the unbiased rounding mode is selected (RDM is asserted) and bit positions 15 to 0 are all zero (i.e. the Z16 signal is active), the output of an AND gate 1382 forming the signal UR is high. The UR signal is inverted by the inverter 1374 to generate the signal UR, which in this case is low. The effect of the low signal is to dominate the AND gates 1360, 1362, 1364, such that the output of the OR gate 1366 is zero, which has the effect of forcing bit position 16 to zero. Thus, when the LSB field [15:0] has a value equal to 0.5 and the MSB field [31:16] has an odd value prior to rounding, bit 516 is set to zero. Likewise, when the LSB field has a value equal to 0.5 and the MSB field has an even value prior to rounding, bit 516 is not forced to zero.

When either the unbiased rounding mode is not selected (RDM is not asserted) or bit positions 15 to 0 are not all zero (then the Z16 signal is not active), then the output of the AND gate 1362 forming the signal UR will be low. The inverted UR signal from the inverter 1374, i.e. the UR signal, is then high, such that the UR signal does not dominate the AND gates 1360, 1362, 1364. As a result, the setting of bit position 16 is controlled according to the saturation mode in the same manner as for bit positions 39 to 17. It will be appreciated that without the signal UR, and the circuitry for generating that signal, the cell for bit position 16 corresponds to that of bit positions 39 to 17.

The presence of the special saturation cell of FIG. 17C, as described above to force the 17th bit (bit position 16) to zero can be used in combination with the zero anticipation circuitry to provide unbiased rounding in an efficient manner. There is a need to provide rounding which does not introduce a bias and which can be implemented efficiently. The provision of the foregoing structure provides this functionality.

Accordingly, there now follows an explanation of what unbiased rounding is and its effect. Unbiased rounding differs from conventional rounding only in one case, as illustrated in FIG. 18A. FIG. 18A depicts when a calculation result is exactly P.5, where P.5 is a value half way between P and P+1, and where P is a value expressed to a predetermined accuracy. In the particular example, P is a binary value for which the 16 lsbs are zero.

When unbiased rounding is selected and a zero is detected on the 16 lsbs of a calculation result, the 17th bit (bit position 16) is forced to zero. This results in unbiased rounding in that, in the final 32 bit adder, addition of 1 at bit position 15 will already have occurred and the 16 lsbs have a zero value when the LSB field is exactly equal to 0.5. FIGS. 18B and 18C illustrate the two alternative states for bit position 16 and illustrate that whatever value is in bit position 16, it must be forced to 0, if zero detection has occurred in bit positions 15–0.

The determination of whether the 16 lsb bit positions are zero is detected using the zero result anticipation approach mentioned earlier herein with reference to FIGS. 11 to 15 after a "1" is added at bit X15 in response to the RND signal, as discussed with reference to FIG. 5.

In particular, zero anticipation is performed on a propagation tree of a carry lookahead structure that is a portion of final adder 140. This uses the carry and sum generated from the partial product reduction tree. From the carry and sum, a zero result for the bit position 16 is anticipated by mapping the propagation tree onto the one-zero result of the first 16 bits. This provides a propagation speed at least as fast as the carry propagation of the final adder. From the zero result, whether bit position 16 has to be forced to zero or not can then be predicted.

Detection of an overflow on 40 bits is also provided. A control bit ovf40, FIG. 2, will enable an overflow on 32 bits if it is off, or an overflow on 40 bits if it is on. This detection will occur in the final 8 bits of the final adder. A 40 bits overflow will occur if the final sum for bit 39, S39, is different from the final sum for bit 40, S40. S40 is not calculated but can be deduced, as indicated by the circuit depicted in FIG. 19A and the logic of FIG. 19B. Ovf is then directly implemented with 2 XOR gates. The final result will then be forced to 0×7fffffffff, or 0×8000000000 if Saturation (ovm) is on.

Having now described the MAC unit 100 with respect to its architecture, sub-units and specific circuits for use in sub-units, the discussion will now turn to looking at the MAC unit 100 as a block and then identifying what signals are supplied to this block as inputs and what signals this block outputs. This is followed by a discussion of placing two of these blocks together and identifying signals for this dual MAC configuration. This is then followed by a brief discussion of a preferred DSP core that utilizes a dual MAC unit of the present invention.

Figure 20:
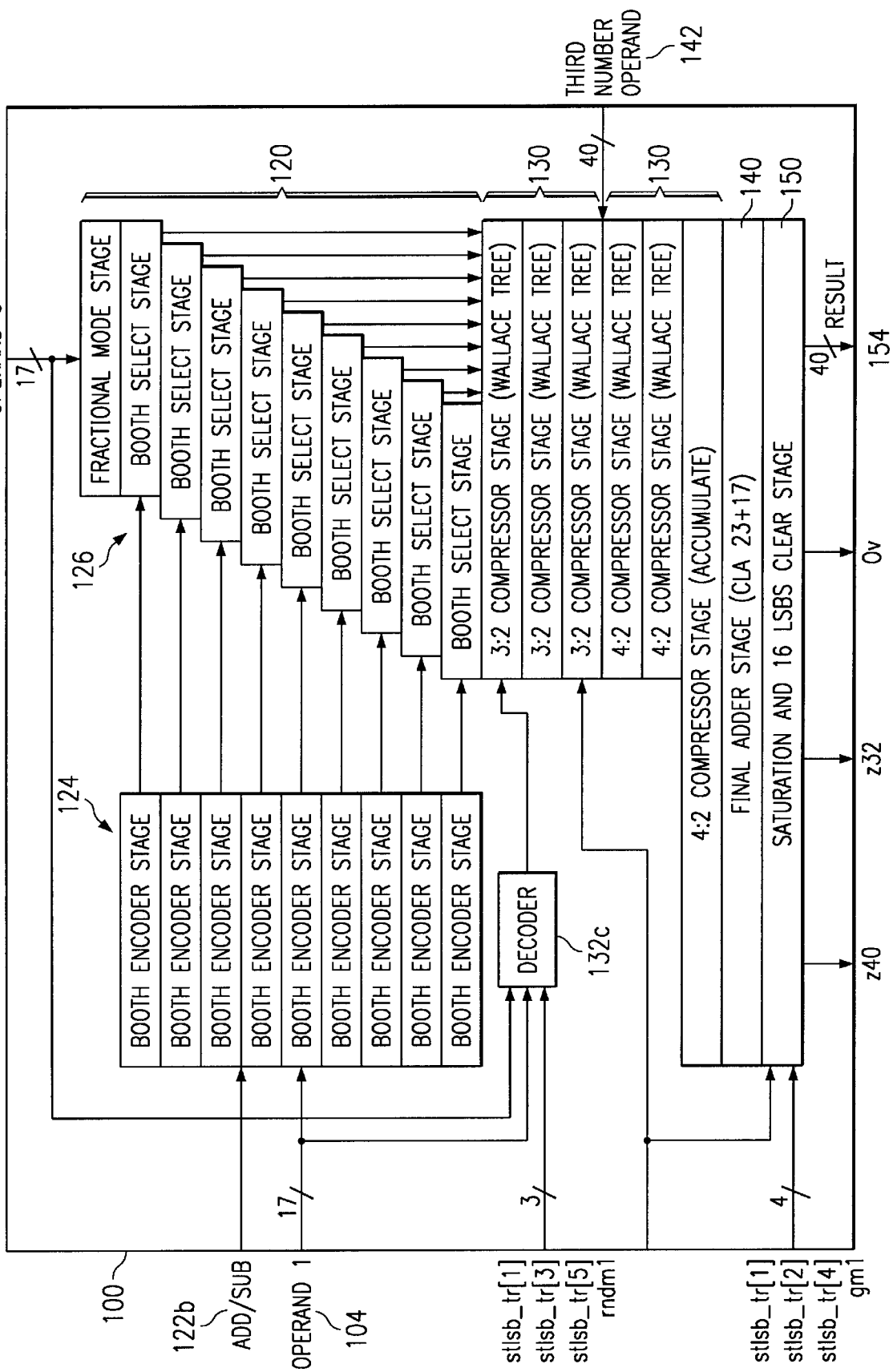
FIG. 20 depicts a high level functional block diagram of a MAC unit of the present invention that depicts the signals supplied to the MAC as inputs and the signals provided by the MAC as outputs.

Referring now to FIG. 20, there may be seen a diagram of the input and output signals for a MAC unit 100 of the present invention. More particularly, there may be seen a high level functional block diagram of a MAC unit 100 of the present invention that depicts the signals supplied to the MAC as inputs and the signals provided by the MAC as outputs.

As may be seen from FIG. 20, there are three operands provided as inputs to the MAC unit, a 17 bit X operand 0 input, 102, a 17 bit Y operand 1 input 104, and a 40 bit third number operand 142. The outputs are a 40 bit final result 154, a zero detection for 40 bits, (Z40), a zero detection for 32 bits (Z32), and an overflow flag (OV). The input status signals are st1sb_tr[1]–st1sb_tr[5] and correspond to the GSM, RDM, FRCT, M40, and SATD status bits. The rndml signal corresponds to the rounding mode selection control signal. The gml signal corresponds to the control signal for selecting between 32 bit operations or 40 bit operations. The add/subtract signal 122b is also provided as an input signal. In addition, various signals that select whether the operands are signed or unsigned, and determine the operation to be performed by the MAC unit 100 are also supplied (though not depicted in FIG. 20). Further, various clock signals are supplied to the MAC unit 100 (not depicted in FIG. 20).

Figure 21:
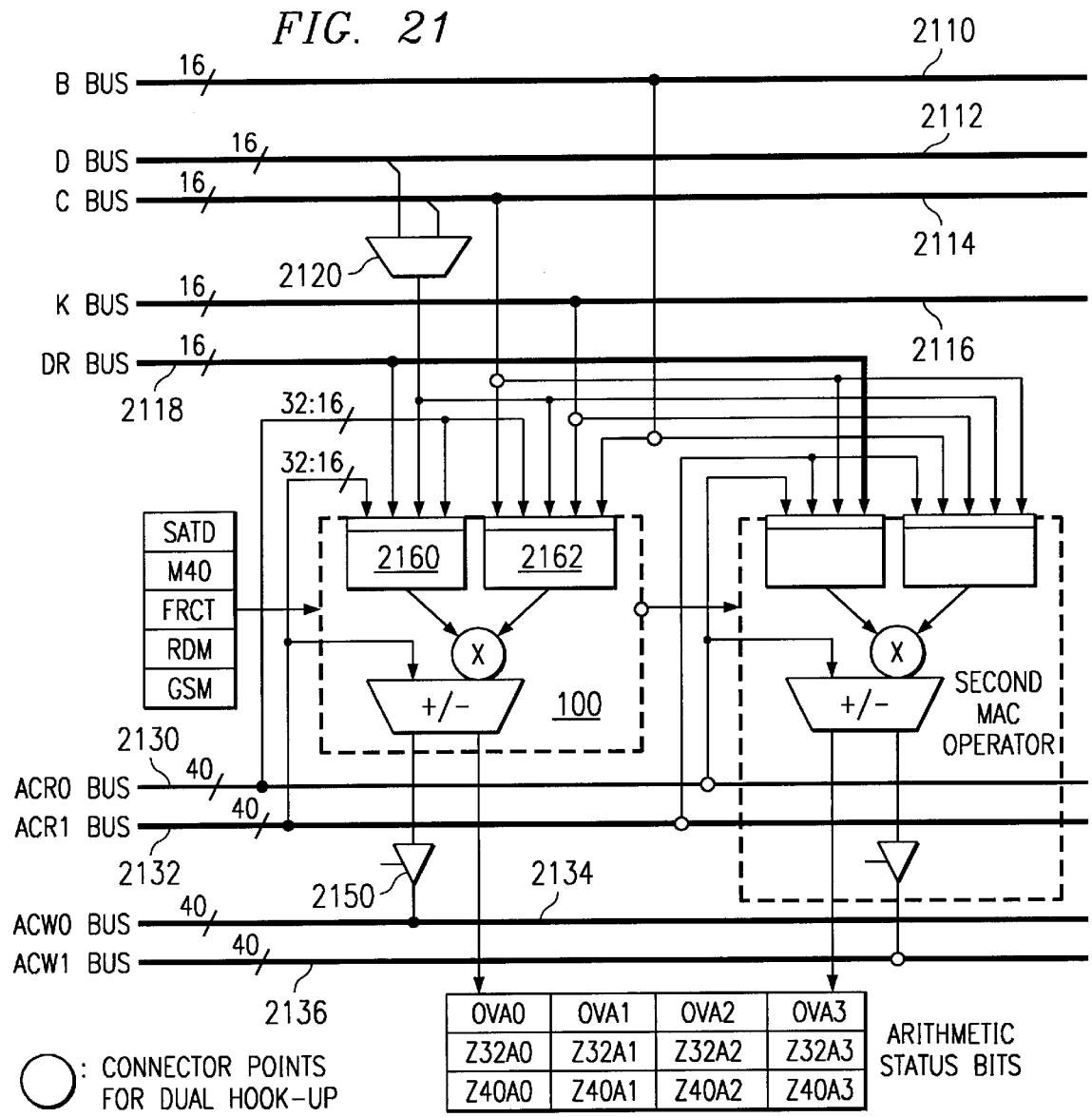
FIG. 21 depicts a simplified block diagram of the MAC unit 100 of the present invention interconnected with various busses for data sources and data destinations.

Referring now to FIG. 21, there may be seen a simplified block diagram of the MAC unit 100 of the present invention interconnected with various busses for data sources and data destinations. There may also be seen a second MAC unit 100 interconnected with the same bus structure. This second MAC unit 100b is the same as the MAC unit described herein and its operation with the first MAC unit is described later herein. As may be seen from FIG. 21, the two operands for the first MAC unit 100 may come from a plurality of sources including busses B 2110, D 2112, C 2114, K 2116, DR 2118, ACR0 2130, and ACR1 2132. ACR0 and ACR1 are the read busses for the data registers, which preferably includes the accumulator registers. ACW0 2134 and ACW1 2136 are the write busses for these data registers. The DR bus 2118 carries values from a general purpose area of registers. Two input operand multiplexers 2160, 2162 select which bus supplies an operand to the MAC unit. The final result from the MAC unit is provided to ACW0 2134 by tri-statable drivers 2150. It may also be seen that ACR1 supplies the third number 142 to the MAC unit. There may further be seen the interconnections for input status signals and output flags. Finally, a multiplexer 2120 may be employed to select between bus D or C as one possible input to multiplexer 2160.

In a similar manner the second MAC unit 100b is interconnected with the bus structure and input status signals and output flags.

Figure 22:
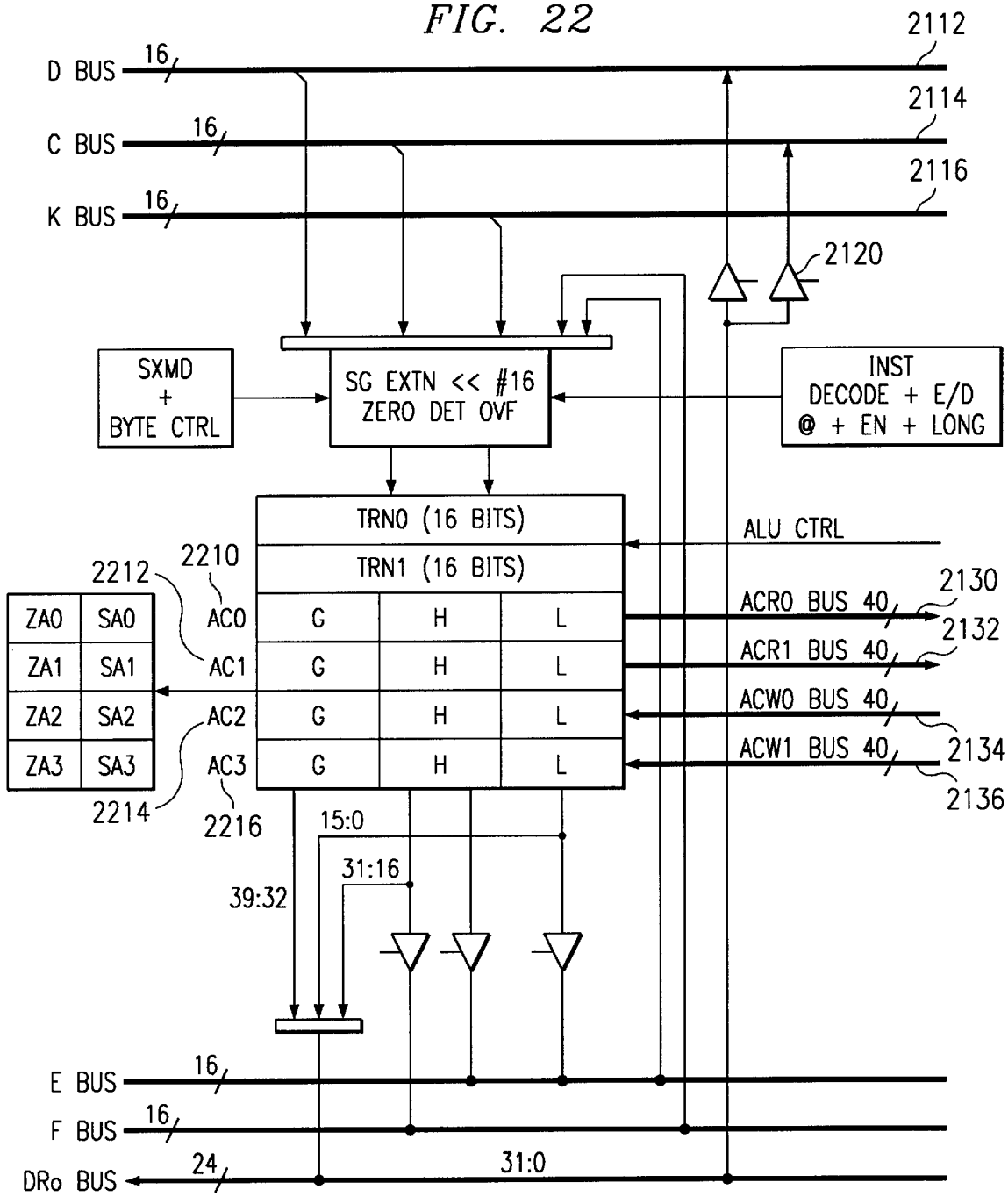
FIG. 22 depicts a simplified block diagram of the presently preferred accumulator registers and their interconnections with a portion of the bus structure of FIG. 21.

Referring now to FIG. 22, there may be seen a simplified block diagram of the four presently preferred accumulator registers AC0–AC3, 2212–2216. These registers are interconnected with a portion of the bus structure of FIG. 21. Thus, FIG. 22 illustrates how data may move from an accumulator via the bus structure to the MAC unit (or units) and back to the same or a different accumulator. FIG. 22 illustrates that each accumulator has a low (L) (15–0), high (H) (31–16), and guard bit (G) (39–32) section. Again tri-statable drivers (2220) may be used to drive the data in an accumulator onto certain of the busses.

Preferably, a MAC unit 100 of the present invention is implemented with two accumulators. A further feature of the invention is a capability to transfer the contents from one accumulator into the other. This capability is useful in applications like computation of Fourier transforms.

In a preferred embodiment, a high-speed 17×17 bit fixed point multiplier-accumulator is fabricated in CMOS technology. In its operation two 17 bit operands, either of which may be unsigned or signed, are multiplied to provide a 34 bit result. This result may be loaded into either or both 40 bit accumulators. The results may also be added to or subtracted from either accumulator and returned to either or both accumulators. Transfer or arithmetic operations can include a 16 bit shift operation of the source accumulator contents. Any accumulate operation includes provision for rounding to the nearest 16 or 32 bit result.

Operands are selected from one of two registers on each input port. All 40 bits of the accumulator are available for output in parallel. The 40 bit or 6 msb accumulator contents are tested for sign, zero and overflow and three status flags generated. Overflow may by corrected by automatic substitution of a saturation value in place of the overflowed one. Rounding and overflow are initiated under specific control signals.

Limiting signed data in 40-bit format or in 16-bit representation from internal registers is called saturation and is controlled by the SATD flag or by specific instructions. The saturation range is controlled by a saturation mode flag called M40. Saturation limits the 40-bit value in the range of $-2^{31}$ to $2^{31}-1$ and the dual 16-bit value in the range of $-2^{15}$ to $2^{15}-1$ for each 16-bit part of the result if the M40 flag is off. If it is on, values are saturated in the range of $-2^{39}$ to $-2^{39}-1$ or $-2^{15}$ to $2^{15}-1$ for the dual representation. For the MAC the sign of the input operands is determined as follows: SI=!UNS AND (input bit 15). M40 selects between 40 bit (when "one") and 32 bit (when "zero") operations. As noted above, overflow detection depends upon M40, as does sign and zero detection.

In order to go from a 40-bit representation to a 16-bit one, rounding has to occur to keep accuracy during computations. Rounding may be managed via the instruction set, through a dedicated bit field, and via a flag called RDM (for unbiased rounding). The combination of these result in the following modes:

When rounding (rnd) is "on" then:
    RDM=0: generates Round to+infinity For a 40-bit data value, this means the addition of $2^{15}$ and the 16 least significant bit (lsbs) are cleared to zero.
    RDM=1: generates Round to the nearest For a 40-bit data value, this is a true analysis of the 16 lsbs to detect if they are in the range of: (i) $2^{15}-1$ to 0 (value lower than 0.5) where no rounding occurs, (ii) $2^{15}+1$ to $2^{16}-1$ (value greater than 0.5) where rounding occurs by addition of $2^{15}$ to the 40-bit value, or (iii) $2^{15}$ (value equals 0.5) where rounding occurs if the 16-bit high part of the 40-bit value is odd, by adding $2^{15}$ to the data value.

The 16 lsbs are cleared to zero for all three cases, regardless of saturation. When rounding mode is "off", then nothing is done.

The FRCT (or FRACT) status bit is used to indicate a fractional mode. When this status bit is set the multiplier output is left shifted by one bit to compensate for an extra sign bit.

The multiplication operations work with 16-bit signed or unsigned data (as operands for the multiplier) and with a 40-bit value from internal registers (registers are accumulator). The result is preferably stored in one of the 40-bit Accumulators. Multiply or multiply/accumulate is under control of FRACT, SATD and Round mode control signals. Multiply or multiply/accumulate is also affected by the GSM mode which generates a saturation to "00 7FFF FFFF" (hexa) of the final result when the two multiply operands are both equal to $-2^{15}$ and the FRACT and SATD modes are on.

For sign handling purpose, the multiply operands are actually coded on 17 bits (so the sign is doubled for 16-bit signed data). These operands are always considered signed unless otherwise controlled by an instruction. When the source of these values is an internal register then a signed 17-bit accurate computation is usable. The functional operations available on multiply-and-accumulate circuits of the present invention are: MPY—multiply operation, MAC—multiply and add to accumulator content, and MAS—subtract multiply result from the accumulator content.

Table 5 below shows all possible combinations and corresponding operations. The multiply and the "multiply-and-accumulate" operations return two status bits or flags, i.e. Zero and Overflow (OVF) detection.

Shifting operations by 16 towards lsbs involved in MAC instructions are all performed in the MAC unit and sign propagation is always performed and uses the bit 39.

Destination of results is always one of the internal Data Registers. Table 6 shows the allowed combinations of inputs (x, y ports). Accumulator "a" is always an internal data register; it can be shifted by 16 positions to the lsbs before use.

TABLE 6

| Y X | 16 bit data (RAM) | 16 bit data (reg) | 17 bit data (reg) | 16 bit data (CDP) | 16 bit data (imm.) |
|---|---|---|---|---|---|
| 16-bit data (RAM) | OK | — | OK | OK | — |
| 16-bit data (reg) | OK | — | OK | — | OK |
| 17-bit data (reg) | — | — | OK | — | OK |
| 16-bit data (CDP) | — | — | — | — | — |
| 16-bit data (intermediate) | — | — | — | — | — |

Data coming from memory are transferred via D and C busses. In order to allow automatic addressing of coefficients

TABLE 5

MPY, MAC, and MAS Operations

| FRACT | GSM | SATD | RND | MPY | MAC | MAS |
|---|---|---|---|---|---|---|
| on | off | off | off | x*(2*y) | x*(2*y)+a | a-x*(2*y) |
| off | off | off | off | x*y | x*y+a | a-x*y |
| on | on | off | off | x*(2*y) | x*(2*y)+a | a-x*(2*y) |
| off | on | off | off | x*y | x*y+a | a-x*y |
| on | off | on | off | satM40(x*(2*y)) | satM40(x*(2*y)+a) | satM40(a-x*(2*y)) |
| off | off | on | off | satM40(x*y) | satM40(x*y+a) | satM40(a-x*y) |
| on | on | on | off | satM40(x*(2*y)) x=y=$2^{15}$:$2^{31}$-1 | satM40(x*(2*y)+a) satM40($2^{31}$-1+a) | satM40(a-x*(2*y)) satM40(a-$2^{31}$+1) |
| off | on | on | off | satM40(x*y) | satM40(x*y+a) | satM40(a-x*y) |
| on | off | off | on | mdRDM(x*(2*y)) | mdRDM(x*(2*y)+a) | mdRDM(9-x*(2*y)) |
| off | off | off | on | mdRDM(x*y) | mdRDM(x*y+a) | mdRDM(a-x*y) |
| on | on | off | on | mdRDM(x*(2*y)) | mdRDM(x*(2*y)+a) | mdRDM(a-x*(2*y)) |
| off | on | off | on | mdRDM(x*y) | mdRDM(x*y+a) | mdRDM(a-x*y) |
| on | off | on | on | satM40(mdRDM(x*(2*y))) | satM40(mdRDM(x*(2*y)+a)) | satM40(mdRDM(a-x*(2*y))) |
| off | off | on | on | satM40(mdRDM(x*y)) | satM40(mdRDM(x*y+a)) | satM40(mdRDM(a-x*y)) |
| on | on | on | on | satM40(mdRDM(x*(2*y))) x=y=$2^{15}$:$2^{31}$-1 | satM40(mdRDM(x*(2*y)+a)) satM40(mdRDM($2^{31}$-1+a)) | satM40(mdRDM(a-x*(2*y))) satM40(mdRDM(a-$2^{31}$+1)) |
| off | on | on | on | satM40(mdRDM(x*y)) | satM40(mdRDM(x*y+a)) | satM40(mdRDM(a-x*y)) | mdRDM():rounding under control of RDM flag
satM40():saturation under control of M40 flag The multiply and accumulate unit 100 preferably performs its task in one CPU clock cycle. The input operands use a 17-bit signed representation while accumulation is for 40 bits. Arithmetic modes, exceptions and status flags are also handled. Saturation mode selection can be also defined dynamically in the instruction.

Figure 23:
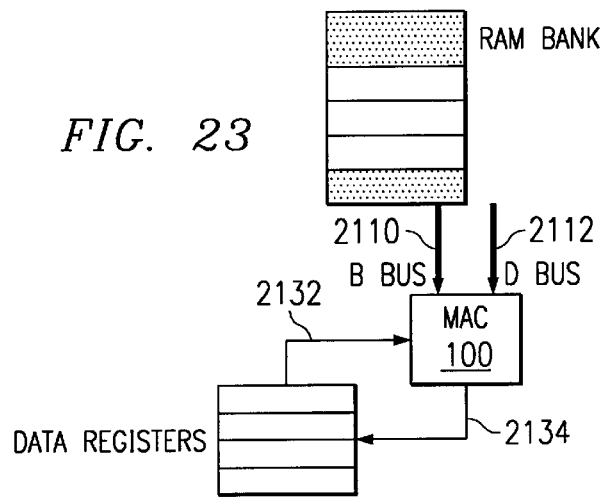
FIG. 23 depicts a simplified block diagram depicting bus, memory and register utilization by a MAC unit of the present invention.

| Possible sources of operands are defined below: | | |
|---|---|---|
| from memory: | 2 | 16-bit data from RAM, |
|  | 1 | 16-bit data from "coeffecient" RAM, |
| from internal Data registers: | 2 | 17-bit data from high part (bits 32 to 16) of register, |
|  | 1 | 40-bit data for accumulation, |
| from instruction decode: | 1 | 16-bit "immediate" value, |
| from other 16-bit registers: | 1 | 16-bit data. | without sacrificing a pointer, a third dedicated bus is provided and called B bus. Coefficient and data delivery will combine B and D busses as shown in FIG. 23. The B bus will be associated with a given bank of the memory organization. This bank will be used as "dynamic" storage area for coefficients.

Access to the B bus will be supported in parallel with a Single, Dual or Long access to other parts of the memory space and only with a Single access to the associated memory bank. Addressing mode to deliver the B value will use a base address (16 bits) stored in a special pointer (CDP—memory coefficient data pointer) and an incrementor to scan the table. This pointer is managed separately and can be incremented, decremented, or signed index post incremented to fetch data (typically "coefficients"). In order to provide necessary data bandwidth for fetching on B, C and D busses, the B access should be performed on a different memory bank than the two others.

Referring now to FIG. 23, there may be seen a simplified block diagram depicting bus, memory and register utilization by a MAC unit of the present invention. More particularly, it may be seen that a first RAM bank is used to supply one operand via bus B and a second operand is supplied from a second RAM bank (not depicted) via bus D. The output of the MAC unit is passed to a register (preferably an accumulator) via bus 2134 and the register value is supplied to the MAC via bus 2132.

In order to support increasing demand of computation power and keep the capability to get the lowest (area and power) if needed, the MAC unit will be able to support dual multiply-and-accumulate operations in a configurable way. This is based on several features:

- it will be possible to plug-in a second MAC hardware with same connectivity to the operands sources and destination as the main one,
- the plugged-in operator will be stopped when only one MAC per cycle is needed during the algorithm execution,
- the control of the second MAC is performed via an instruction class "Dual MAC", which allows combinations of operations MPY/MAC/MAS on the two operators and the decoding of which generates necessary control signals for gating the execution clock of the second MAC,
- in terms of throughput, the most efficient usage of the dual MAC execution requires a sustained delivery of 3 operands per cycle, as well as two accumulator contents, for DSP algorithms. Not breaking the whole busses architecture while still offering an increase in computation power, the B bus system gives the best flexibility to match this throughput requirement. Thus, the "coefficient" bus and its associated memory bank will be shared by the two operators as described in FIG. 24. Advantageously, sharing the coefficient bus and its associated memory bank reduces power consumption over a system with a replicated coefficient structure. Likewise, power saving results from storing MAC coefficients in the DRx CPU registers which are shared between MAC1 and MAC2.

The instruction that will control this execution will offer dual addressing on the D and C busses as well as all possible combinations for the pair of operations among MPY, MPYSU, MAC and MAS operations and signed or unsigned operations. Destinations (Accumulators) in the Data Registers can be set separately per operation but accumulators sources and destinations are equal. Rounding is common to both operations. CDP pointer and update mechanism will include increment/decrement, or signed index post increment or no change of the previous value and modulo operation. Advantageously, an embodiment of the present invention provides a dual MAC structure which allows loop optimization by pointer post modification on a first path, parallel MAC operation, and post modification of three pointers for operand management in a single cycle. Finally, Table 7 shows application of the scheme depicted in FIG. 24 to different algorithms and RAM storage organizations.

TABLE 7

| Algorithm | B RAM Bank content | D, C RAM Bank content |
|---|---|---|
| FIR s(0:p-1) <br> n-1 <br> s(i)=Sc(j).x(i-j) <br> j-o | c(j) | D:x(i-j) <br> C:x(i+1-j) |

TABLE 7-continued

| Algorithm | B RAM Bank content | D, C RAM Bank content |
|---|---|---|
| Matrix Multiply: <br> p(0:n-1,0:n-1) <br> n-1 <br> p(ij)=Sa(i,k)*b(kj) <br> k=0 | b(kj) | D:a(i,k) <br> C:a(i+1,k) |
| IIR: s(0:p-1) <br> n-1 <br> s(i)=Sc(j).s(i-j-1) <br> j-o | s(i-j-1) | D:c(j) <br> C:c(j+1) |
| AutoCorrel:x(0:159) <br> S(0:8) <br> 159 <br> s(i)=Sx(j).x(j-1) <br> j=1 | x(j-i) | D:x(j) <br> C:x(j+1) |
| FFT: 128 points | W(j) <br> (complex) | D:Re(x(j)) <br> C:Im(x(j)) |

For exceptions and status bits handling, the Dual-MAC configuration will generate a double set of flags, one per accumulator destination.

Figure 24:
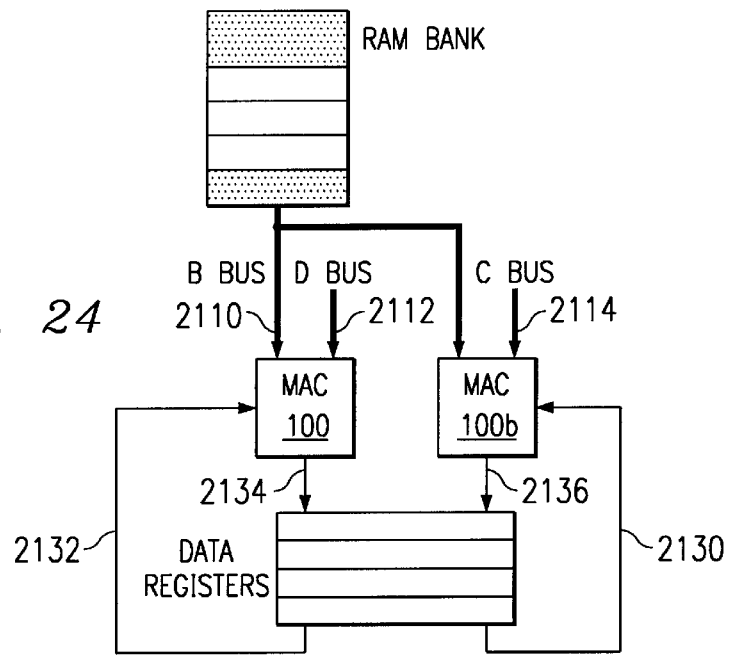
FIG. 24 depicts a simplified block diagram depicting bus, memory and register utilization by a dual MAC unit of the present invention.

Referring now to FIG. 24, there may be seen a simplified block diagram depicting bus, memory and register utilization by a dual MAC unit of the present invention. More particularly, it may be seen that a first RAM bank supplies a first operand to both MAC units. A second RAM bank supplies a second operand to the first MAC unit via bus D. Similarly, a third RAM bank supplies a second operand to the second MAC unit via bus C. Both MACs provide outputs to the registers (preferably accumulators) via respective output busses and receive inputs from the registers via respective input busses.

Figure 25:
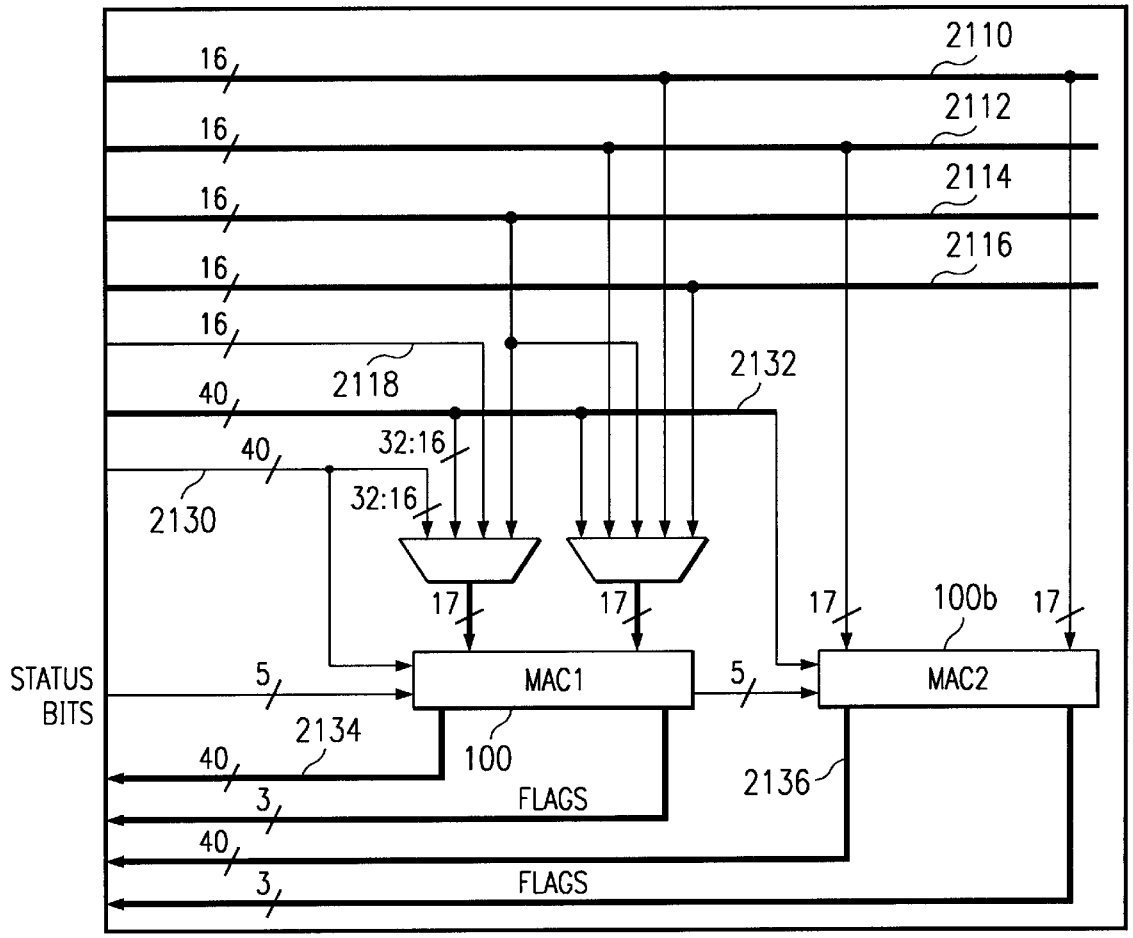
FIG. 25 depicts a simplified block diagram depicting bus interconnections for a presently preferred dual MAC arrangement of the present invention.

Referring now to FIG. 25, there may be seen a simplified block diagram depicting bus interconnections for a presently preferred dual MAC arrangement of the present invention. More particularly, it may be seen that the number of data sources for the second MAC have been reduced from those of FIG. 21.

Figure 26A:
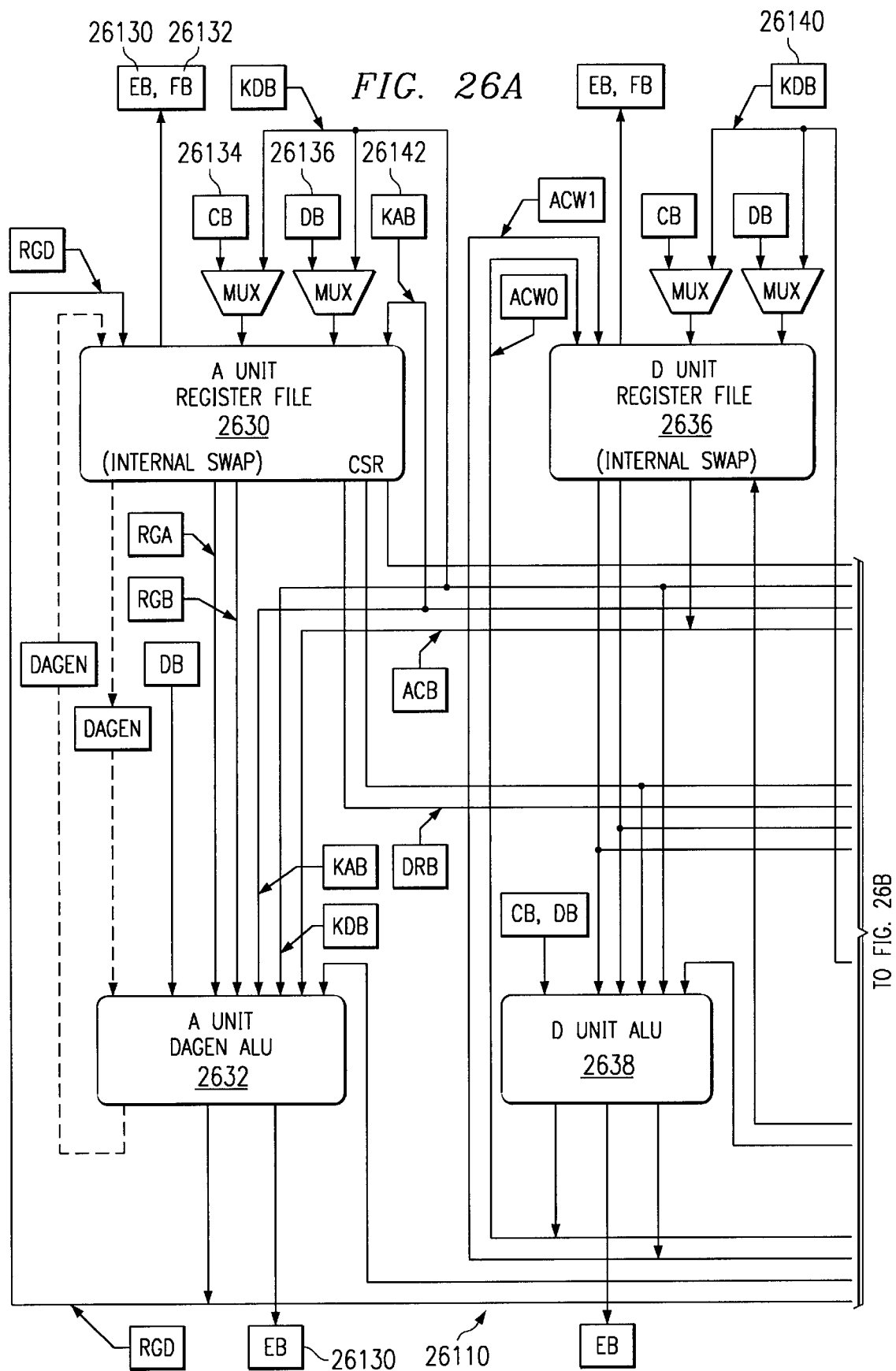
FIG. 26 depicts a DSP that utilizes the dual MAC unit of the present invention.
Figure 26B:
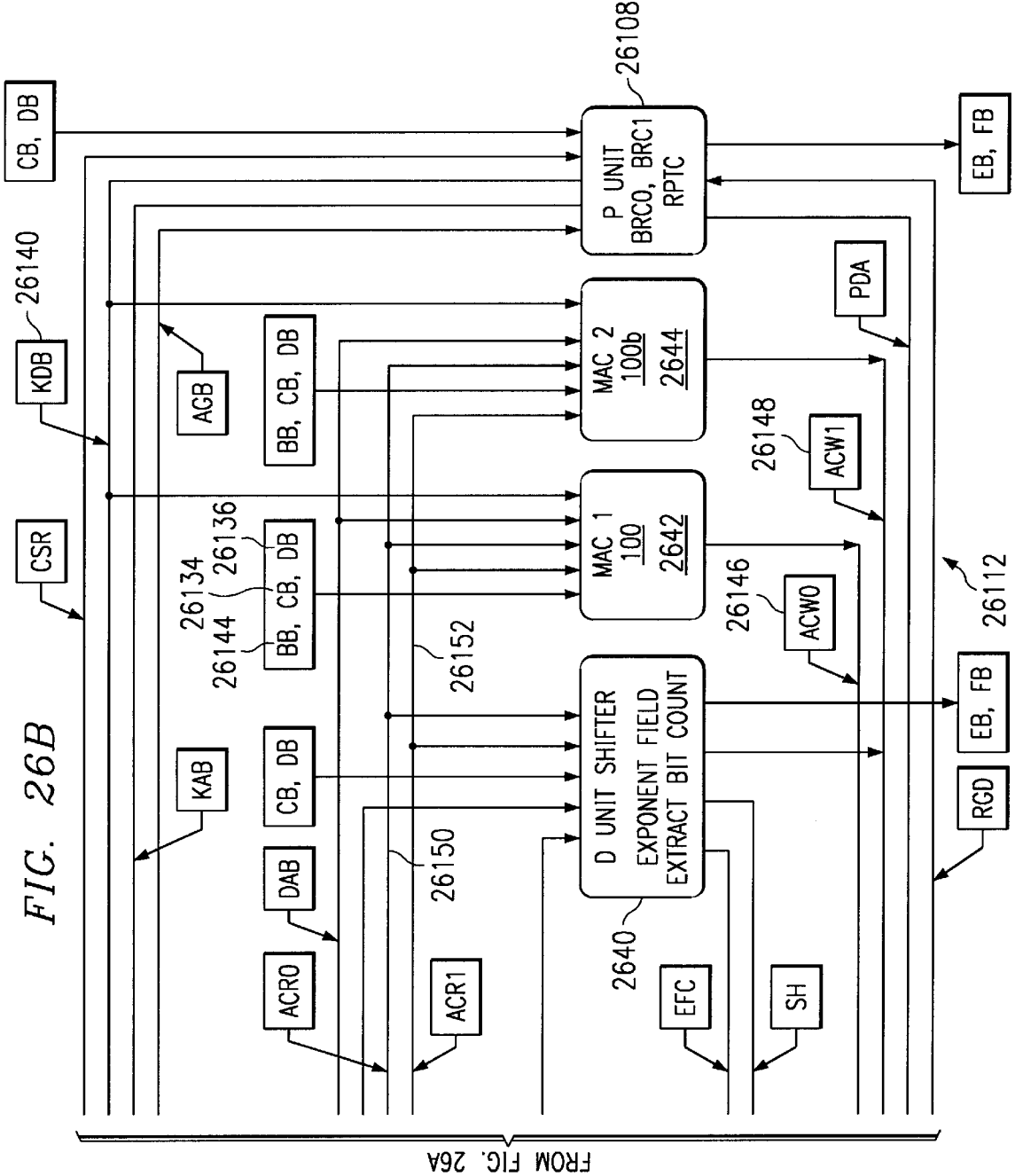

FIG. 26 is a block diagram of a microprocessor, which has an embodiment of the present invention. This microprocessor is a digital signal processor ("DSP"). In the interest of clarity, FIG. 26 only shows those portions of the microprocessor that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of the microprocessor relevant to an embodiment of the present invention are explained in sufficient detail herein, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977, which is incorporated herein by reference.

Referring now to FIG. 26, there may be seen a DSP that utilizes the dual MAC unit of the present invention. FIG. 26 illustrates function and execution units P Unit 26108, A Unit 26110 and D Unit 26112 of a processing core 26102 and shows the bus structure connecting the various elements of the processing core 26102. The P Unit 26108 includes, for example, loop control circuitry, GoTo/Branch control circuitry and various registers for controlling and monitoring program flow such as repeat counter registers and interrupt mask, flag or vector registers. The P Unit 26108 is coupled to a general purpose Data Write busses (EB,FB) 26130, 26132, Data Read busses (CB,DB) 26134, 26136 and a coefficient program bus (BB) 26138. Additionally, the P Unit 26108 is coupled to sub-units within the A Unit 26110 and D Unit 26112 via various busses labeled CSR, ACB and RGD.

As illustrated in FIG. 26, in the present embodiment the A Unit 26110 includes three sub-units, namely a register file 2630, a data address generation sub-unit (DAGEN) 2632 and an Arithmetic and Logic Unit (ALU) 2634. The A Unit register file 2630 includes various registers, among which are 16 bit pointer registers (AR0, . . . , AR7) and data registers (DR0, . . . DR3) which may also be used for data flow as well as address generation. Additionally, the register file includes 16 bit circular buffer registers and 7 bit data page registers. As well as the general purpose busses (EB, FB,CB,DB) 26130, 26132, 26134, 26136, a coefficient data bus 26140 and a coefficient address bus 26142 are coupled to the A Unit register file 2630. The A Unit register file 2630 is coupled to the A Unit DAGEN unit 2632 by unidirectional busses 26144 and 26146, respectively operating in opposite directions. The DAGEN unit 2632 includes 16 bit X/Y registers and coefficient and stack pointer registers, for example for controlling and monitoring address generation within the processing engine 26100.

The A Unit 26110 also comprises a third unit, the ALU 2634 which includes a shifter function as well as the functions typically associated with an ALU such as addition, subtraction, and AND, OR and XOR logical operators. The ALU 2634 is also coupled to the general purpose busses (EB,DB) 26130, 26136 and an instruction constant data bus (KDB) 26140. The A Unit ALU is coupled to the P Unit 26108 by a PDA bus for receiving register content from the P Unit 26108 register file. The ALU 2634 is also coupled to the A Unit register file 2630 by busses RGA and RGB for receiving address and data registers contents and by a bus RGD for forwarding address and data to registers in the register file 2630.

In accordance with the illustrated embodiment of the invention D Unit 26112 includes the five elements, namely a D Unit register file 2636, a D Unit ALU 2638, a D Unit shifter 2640 and two multiply and accumulate units (MAC1, MAC2) 42 AND 44. The D Unit register file 2636, D Unit ALU 2638 and D Unit shifter 2640 are coupled to busses (EB,FB,CB,DB and KDB) 26130, 26132, 26134, 26136 and 26140, and the MAC units 2642 and 2644 are coupled to the busses (CB,DB,KDB) 26134, 26136, 26140 and Data Read bus (BB) 26144. The D Unit register file 2636 includes four 40-bit accumulators (AC0, . . . AC3) and a 16-bit transition register. The D Unit 26112 can also utilize the 16 bit pointer and data registers in the A Unit 26110 as source or destination registers in addition to the 40-bit accumulators. The D Unit register file 2636 receives data from the D Unit ALU 2638 and MACs 1&2 2642, 2644 over accumulator write bus (ACW0, ACW1) 26146, 26148, and from the D Unit shifter 2640 over accumulator write bus (ACW1) 26148. Data is read from the D Unit register file accumulators to the D Unit ALU 2638, D Unit shifter 2640 and MACs 1&2 2642, 2644 over accumulator read busses (ACR0,ACR1) 26150, 26152. The D Unit ALU 2638 and D Unit shifter 2640 are also coupled to sub-units of the A Unit 26108 via busses labeled EFC, DRB, DR2 and ACB.

Figure 27B:
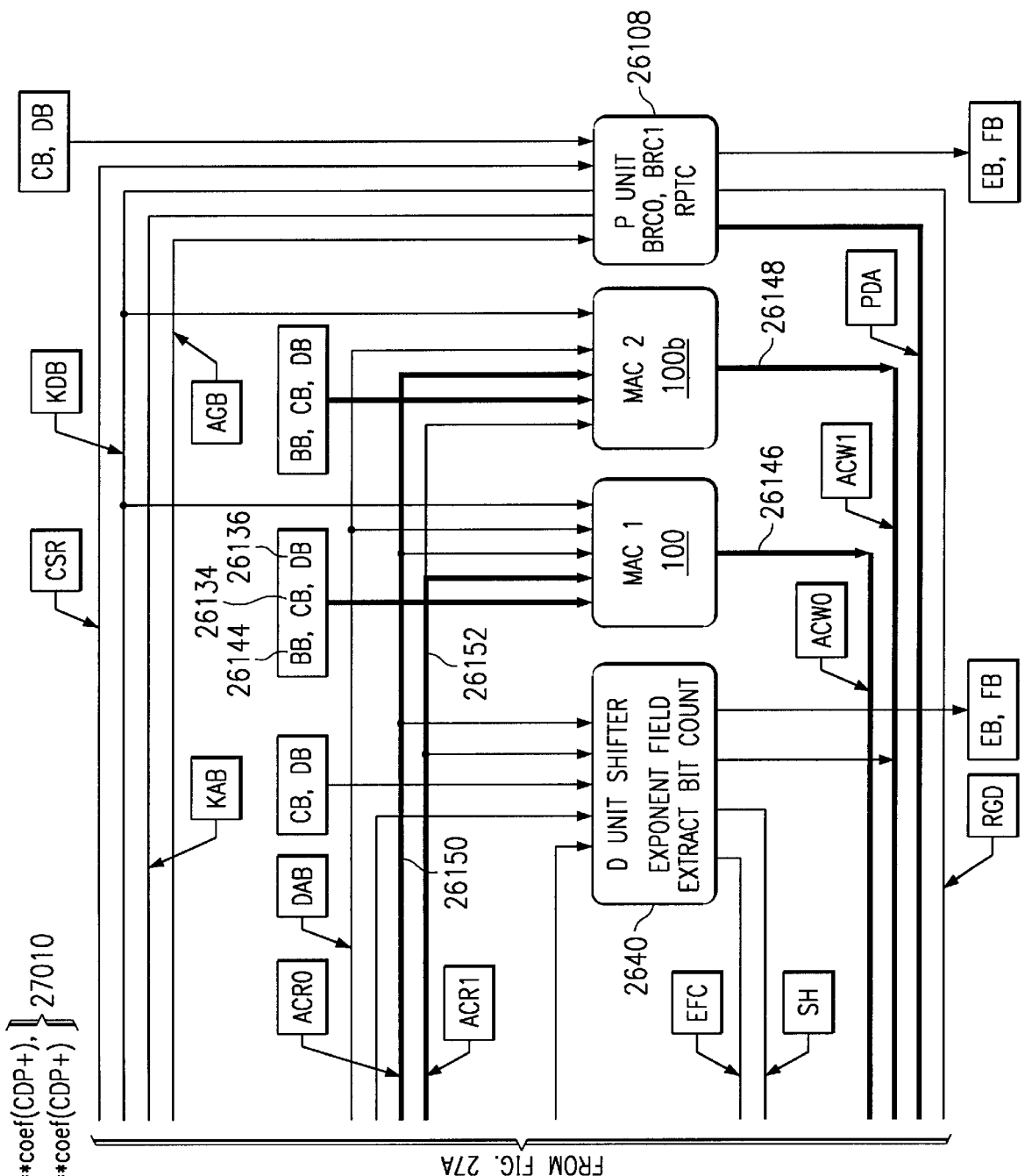
FIG. 27 depicts the DSP of FIG. 26 with highlighted data paths for a dual MAC instruction.

Referring now to FIG. 27, there may be seen the DSP of FIG. 26, but with highlighted data paths for a dual MAC operation. An example MAC instruction is depicted in the upper right hand portion of FIG. 27 at 27010. When an instruction does not require operation of the second MAC, it is powered down by killing its clock trees to reduce power consumption by the DSP.

Although the present invention and its advantages have been described in detail, it should be understood that various changes, substitutions and alterations may be made herein without departing from the spirit and scope of the invention, as defined in the appended claims.

What is claimed is:

1. A digital system comprising a processor with a dual multiply-accumulate (MAC) unit, wherein the dual MAC unit comprises:

a first plurality of selectable inputs associated with a first MAC unit of the dual MAC unit for producing a first output;

a second plurality of selectable inputs associated with a second MAC unit of the dual MAC unit for producing a second output;

first accumulator for receiving said first output;

second accumulator for receiving said second output; and wherein the second MAC unit is operable to be put in a power down mode while the first MAC unit continues processing of operands.

2. The digital system according to claim 1, wherein one of the first plurality of inputs is connected to one of the second plurality of inputs for receiving a shared operand from a memory circuit, whereby power consumption in the processor is reduced by sharing the shared operand.

3. The digital system of claim 2, further comprising:

a memory circuit connected to the first plurality of selectable inputs and to the second plurality of selectable inputs such that the first MAC is operable to receive a first operand from the memory circuit, the second MAC is operable to receive a second operand from the memory circuit, and the first MAC and second MAC are operable to receive and share a third operand, and wherein the memory circuit is operable to provide the first operand, second operand and third operand during a same fetch cycle.

4. The dual MAC according to claim 1, further comprising:

a clock tree for distributing a clock signal to the second MAC, wherein the second MAC operates in response to the clock signal; and clock gating circuitry connected to the clock tree, the clock gating circuitry being responsive to a signal produced when a dual-MAC type instruction is executed, such that the clock signal to the second MAC is gated on if a dual-MAC type instruction is being executed and gated off if a dual-MAC type instruction is not being executed.

5. A method of operating a digital system, wherein the digital system comprises a dual multiply-accumulate (MAC) unit, having a first MAC unit and a second MAC unit, comprising the steps of:

fetching and decoding an instruction that is a dual-MAC instruction for controlling both the first MAC unit and the second MAC unit;

enabling a clock signal to the second MAC unit in response to decoding the dual-MAC instruction to enable operation of the second MAC unit;

performing an operation in first MAC unit and in the second MAC unit in response to the dual-MAC instruction; and disabling the clock signal to the second MAC unit in response to completion of the operation, whereby power dissipation is reduced by automatically disabling the second MAC unit when not in use.

6. A method of operating a digital system according to claim 5, further comprising the steps of:

accessing a first bank of a memory circuit to obtain a first operand and providing the first operand to the first MAC unit;

accessing a second bank of the memory circuit to obtain a second operand and providing the second operand to the second MAC unit; and accessing a third bank of the memory circuit to obtain a third operand and providing the third operand to both the first MAC unit and to the second MAC unit as a shared operand, whereby power consumption of the digital system is reduced by sharing an operand between the dual MAC units.

7. The method of claim 6, wherein all three steps of accessing are performed in a parallel manner in a single access cycle.

8. The method of claim 5, further comprising the steps of:

fetching and decoding an instruction that is a single-MAC instruction for controlling only the first MAC unit;

not enabling the clock signal to the second MAC unit in response to decoding the single-MAC instruction so that the second MAC unit does not dissipate power; and performing an operation in first MAC unit but not in the second MAC unit in response to the single-MAC instruction.

* * * * *